US012573830B1

(12) United States Patent
Nimmo

(10) Patent No.: US 12,573,830 B1
(45) Date of Patent: Mar. 10, 2026

(54) RETRACTABLE ARM HAVING A FLEXIBLE CONDUCTOR FOR ELECTRICAL CONNECTIVITY

(71) Applicant: Stacy Nimmo, Laguna Niguel, CA (US)

(72) Inventor: Stacy Nimmo, Laguna Niguel, CA (US)

( * ) Notice: Subject to any disclaimer, the term of this patent is extended or adjusted under 35 U.S.C. 154(b) by 0 days.

(21) Appl. No.: 19/091,751

(22) Filed: Mar. 26, 2025

(51) Int. Cl.
　　*H02G 11/02* (2006.01)
　　*G05B 19/19* (2006.01)
(52) U.S. Cl.
　　CPC ............. *H02G 11/02* (2013.01); *G05B 19/19* (2013.01)
(58) Field of Classification Search
　　CPC ...... H02G 11/02; H02G 11/003; H02G 11/00; H02G 11/006; G05B 19/19; G03B 17/561; H04N 23/50; H04N 7/144
　　USPC ...................... 191/12 R, 12.2 A, 12.2 R, 12.4
　　See application file for complete search history.

(56) References Cited

U.S. PATENT DOCUMENTS

| | | | | |
|---|---|---|---|---|
| 1,648,909 | A * | 11/1927 | Moon ..................... | H02G 11/02 200/544 |
| 4,348,071 | A | 9/1982 | Hsieh | |
| 5,551,545 | A * | 9/1996 | Gelfman ................ | H02G 11/02 191/12.2 A |
| 6,286,740 | B1 * | 9/2001 | Hayashida ........... | H02G 11/006 226/88 |
| 6,287,021 | B1 | 9/2001 | Katoh et al. | |
| 7,106,597 | B2 | 9/2006 | Kao et al. | |
| 9,265,155 | B2 | 2/2016 | Bartley et al. | |
| 9,875,834 | B2 | 1/2018 | Eral et al. | |
| 12,172,328 | B1 | 12/2024 | Jiang et al. | |
| 2006/0148312 | A1 | 7/2006 | Huang et al. | |
| 2007/0165786 | A1 * | 7/2007 | Grasser ............... | B25J 19/0025 378/194 |
| 2012/0024091 | A1 | 2/2012 | Kawabuchi et al. | |

(Continued)

FOREIGN PATENT DOCUMENTS

WO　　WO-2017221207 A1 * 12/2017 .............. B60L 53/68

OTHER PUBLICATIONS

International Search Report and Written Opinion by the ISA/US of PCT/US2025/021654, dated May 14, 2025.

*Primary Examiner* — Zachary L Kuhfuss
(74) *Attorney, Agent, or Firm* — Hipp Law

(57) ABSTRACT

An apparatus and system for managing a retractable arm configured with a flexible conductor for continuous electrical connectivity are described. The apparatus includes a housing supporting the retractable arm, operable to extend and retract along a defined movement path. A support assembly guides the arm using curvature structures or other mechanisms for stable positioning. The retractable arm exhibits bistability to maintain rigid extended and compact retracted states. A flexible conductor maintains continuous electrical connectivity between a modular device and a controller via a rotary joint assembly, which permits rotational movement while preserving signal and power connections. A horizontal movement track provides structural guidance for lateral positioning, while deployment rails provide structural alignment. One or more sensors enable dynamic adjustment of arm operations based on environmental conditions or proximity information. The controller executes control signals to reposition the arm, enabling obstacle detection, clear path validation, and safety protocols.

19 Claims, 13 Drawing Sheets

(56)  References Cited

U.S. PATENT DOCUMENTS

2012/0048983  A1*   3/2012  Bianco ................. H02G 11/003
                                                  242/388.9
2018/0098036  A1*   4/2018  Cassini ................. H04N 7/152
2019/0145498  A1    5/2019  Yoon et al.
2019/0308523  A1*  10/2019  Tomren ................... B60M 1/20
2025/0026031  A1    1/2025  Cho et al.

* cited by examiner 2B     2B 204     102

100

202

104

206     208

100

RETRACTABLE ARM HAVING A FLEXIBLE CONDUCTOR FOR ELECTRICAL CONNECTIVITY

BACKGROUND

Field of the Art

The disclosure relates generally to retractable mechanisms and integrated flexible circuitry and, more particularly, to an apparatus that includes a retractable arm—such as one employing bistability—and a flexible conductor for continuous electrical connectivity.

Discussion of the State of the Art

The demand for compact and multifunctional devices has led to innovations in retractable and extendable systems for modular components across various industries, including consumer electronics, robotics, surveillance, and smart home technologies. While telescoping mechanisms provide an approach to extending rigid surfaces, they introduce challenges related to interlocking segments, increased wear at joints, and mechanical complexity in maintaining alignment during repeated use. Conventional retractable arms, such as telescoping mechanisms, often suffer from mechanical complexity, limited durability, and challenges with maintaining electrical connectivity during movement.

Conventional designs frequently require complex wiring solutions or rigid structures that impede the compactness and flexibility needed in modern devices. Ensuring continuous electrical connectivity in retractable mechanisms requires careful routing of wiring, which may include coiled cables, ribbon conductors, or mechanical cable tracks, each with its own trade-offs in durability, space efficiency, and signal integrity. Additionally, these designs may not provide the desired stability when extended or efficient space utilization when retracted, resulting in bulkier assemblies and potential reliability issues.

Conventional solutions often struggle to balance the need for structural rigidity with compactness and fail to maintain consistent electrical connectivity through rotational or extendable movements. In systems requiring repeated extension and retraction, wire fatigue and mechanical stress at pivot or connection points further complicate reliability, particularly in high-flex applications. These limitations restrict the adaptability of such systems for modular components, including but not limited to cameras, sensors, microphones, speakers, and lighting modules.

SUMMARY

An apparatus in accordance with the embodiments described herein addresses the technical challenges associated with providing a compact and multifunctional design that integrates a retractable arm (e.g., one configured to be bistable) with a flexible conductor (such as a flexible printed circuit (FPC)) for maintaining continuous electrical connectivity between a modular device and a main printed circuit board (PCB).

As used herein, a "bistable retractable arm" refers to an arm comprising a bistable strip configured to transition between two stable states: an extended rigid position and a compact retracted form. In an embodiment, the arm's convex curvature provides stability when extended, allowing precise positioning of modular components while minimizing space usage when retracted. The rigidity of the bistable strip may be enhanced through various mechanisms, including tensioning mechanisms, reinforcement layers, controlled friction interfaces, or voltage-activated materials such as electroactive polymers or shape-memory alloys, which adjust stiffness based on applied current. In some configurations, mechanical locking mechanisms may also be incorporated to secure the arm in a fixed position. It should be noted that such references to "bistable" also encompass other retractable or resilient-arm designs that exhibit similar stable extended and retracted states.

The electrical connectivity may be implemented via flexible conductors such as printed conductive traces, embedded wiring, or deposited conductive materials. These conductors may be integrated with or without an insulating substrate, depending on the application. Integration with a flexible surface may be achieved through various methods, including but not limited to printed conductive materials, such as screen printing, inkjet deposition, or aerosol jet printing of conductive inks directly onto a flexible substrate; embedded wiring, where conductive pathways are embedded within a flexible dielectric or polymeric structure; material deposition techniques, including chemical vapor deposition (CVD), physical vapor deposition (PVD), electroplating, and sputtering onto a flexible base layer; laminated conductive films, where conductive foils or thin metal layers are bonded to a flexible insulating material; adhesive-backed conductive traces, where pre-fabricated conductive pathways are adhered to a flexible surface; stretchable conductive networks, including conductive mesh structures or patterned liquid metal deposits within elastomeric matrices; conductive fiber or thread integration, where metal-coated or inherently conductive fibers are woven, stitched, or embedded into a flexible textile or polymer, and the like.

In an embodiment, the flexible conductor (such as an FPC) is routed along the retractable arm to ensure durability through repeated extension and retraction. At a pivot point, a rotary joint assembly (also known as a 'slip ring') including rotary traces enables 360-degree rotation of the modular device, preserving uninterrupted signal and power transfer. The rotary joint assembly includes spring-loaded contacts or brushes engaging concentric circular copper pads on the PCB, providing continuous electrical connectivity.

In certain embodiments, the apparatus accommodates various modular devices, including cameras, sensors, microphones, speakers, lighting modules, or other integrated active surfaces. In some configurations, the retractable surface itself may function as an active component—for example, integrating LED arrays, sensor arrays, touch interfaces, transmitters, or receivers—eliminating the need for a separate modular device. When a modular device is present, it mounts at the distal end of the retractable arm, interfacing with the flexible conductor. Upon retraction, the modular device or active surface is concealed, providing compactness and protection within the housing.

In various embodiments, the apparatus incorporates deployment rails providing structural alignment and lateral stability for the retractable arm. A horizontal movement track structurally guides horizontal translation driven by mechanical components, such as a track mount, belt drive pulley, belt, and motor. The overall path of movement of the retractable arm is defined by these guiding elements, including curvature structures, alignment components, and mechanical interfaces, enabling controlled, stable positioning.

The apparatus is applicable in various fields, including consumer electronics, robotics, surveillance systems, and any devices requiring a compact, extendable arm for modular components. The design reduces mechanical complexity compared to conventional telescoping systems, ensuring efficient wire management, compactness, and seamless operation.

The disclosure further provides embodiments, including an apparatus comprising a housing configured to enclose and support a retractable arm, a retractable arm configured to transition between a first position and a second position relative to the housing, a support assembly configured to guide the retractable arm along a path of movement, the support assembly including guiding components operable to control movement along the path of movement, a flexible conductor integrated with the retractable arm, the flexible conductor operable to maintain electrical connectivity between a modular device and a controller, a rotary joint assembly configured to provide rotational movement of the retractable arm while maintaining electrical connectivity through the flexible conductor, and a controller operable to receive input signals, generate control signals, and manage operation of the retractable arm, including movement along the path of movement and modular device control. In a first example of the system, the system further comprises: a deployment rail, wherein the deployment rail is mechanically associated with the housing and operable to guide horizontal movement of the apparatus relative to a mounting surface. In a second example of the system, optionally including the first example The apparatus of claim 1, wherein the path of movement includes linear and curved sections and is guided by components including bearing systems, guide wheels, or magnetic guidance elements. In a third example of the system, optionally including one or both of the first and second examples, the support assembly includes a track mount, a belt drive pulley, and a motor, each mechanically associated with the path of movement and operable to control movement of the retractable arm along the path of movement. In a fourth example of the system, optionally including one or more or each of the first through third examples, the system further comprises: a curvature structure, wherein the curvature structure is operable to provide rigidity in an extended position. In a fifth example of the system, optionally including one or more or each of the first through fourth examples, the support assembly includes a tensioning mechanism, operable to maintain stability of the retractable arm during movement along the path of movement. In a sixth example of the system, optionally including one or more or each of the first through fifth examples, the controller is operable to generate composite control signals for combined linear and rotational movement of the retractable arm. In a seventh example of the system, optionally including one or more or each of the first through sixth examples, the modular device includes one or more of a camera, a sensor, an audio component, a lighting module, or an integrated active surface. In a eighth example of the system, optionally including one or more or each of the first through seventh examples, the rotary joint assembly includes rotary traces and spring-loaded contacts, configured to maintain electrical connectivity through the flexible conductor during rotational movement. In a ninth example of the system, optionally including one or more or each of the first through eighth examples, the controller is operable to implement safety measures, including stopping operations if feedback signals indicate an unsafe condition.

The disclosure also provides support for a system, comprising: a housing configured to enclose and support a retractable arm, a retractable arm configured to transition between a first position and a second position relative to the housing, a support assembly configured to guide the retractable arm along a path of movement, the support assembly including components operable to control movement along the path of movement, a flexible conductor integrated with the retractable arm, the flexible conductor operable to maintain electrical connectivity between a modular device and a controller, a rotary joint assembly configured to provide rotational movement of the retractable arm while maintaining electrical connectivity through the flexible conductor, a controller operable to receive input signals, generate control signals, and manage operation of the retractable arm, including movement along the path of movement and modular device control, and one or more sensors operable to obtain sensor data, wherein the controller is operable to adapt operational parameters of the retractable arm and modular device based on sensor data. In a first example of the system, the one or more sensors include infrared sensors, ultrasonic sensors, LiDAR systems, or visual sensors. In a second example of the system, optionally including the first example, the sensor data includes environmental conditions, positional data, or proximity information. In a third example of the system, optionally including one or both of the first and second examples, the controller is operable to analyze the sensor data to detect obstacles, validate clear paths, and adjust positioning and movement of the retractable arm. In a fourth example of the system, optionally including one or more or each of the first through third examples, the controller is operable to override movement commands if sensor data indicates an unsafe condition. In a fifth example of the system, optionally including one or more or each of the first through fourth examples, the one or more sensors are configured to detect environmental conditions, including temperature, humidity, or proximity to external objects. In a sixth example of the system, optionally including one or more or each of the first through fifth examples, the controller is operable to generate alerts, including visual, auditory, or haptic feedback, based on sensor data indicating obstructions along the path of movement.

The disclosure also provides support for a system, comprising: a housing configured to enclose and support a retractable arm, a retractable arm configured to transition between a first position and a second position relative to the housing, a support assembly configured to guide the retractable arm along a path of movement, the support assembly including components operable to control movement along the path of movement, a flexible conductor integrated with the retractable arm, the flexible conductor operable to maintain electrical connectivity between a modular device and a controller, a rotary joint assembly configured to provide rotational movement of the retractable arm while maintaining electrical connectivity through the flexible conductor, one or more sensors configured to obtain sensor data, a processor, operable to execute instructions, the instructions causing the system to: receive input signals via the controller, generate control signals using the controller, the control signals including instructions to control movement of the retractable arm and operate a modular device, execute control signals to adjust positioning and movement of the retractable arm and modular device based on sensor data. In a first example of the system, the sensor data includes environmental conditions, positional data, or proximity information, and the controller is operable to analyze the sensor data to detect obstacles, validate clear paths, and adjust positioning and movement of the retractable arm. In a second example of the system, optionally including the first example, executing control signals includes validating sensor data for clear paths, synchronizing movement components, and initiating safety protocols if sensor data indicates an unsafe condition.

Various other functions and embodiments are described and suggested below as may be provided in accordance with the various embodiments.

BRIEF DESCRIPTION OF THE DRAWINGS

The accompanying drawings illustrate several embodiments and, together with the description, serve to explain the principles of the invention according to the embodiments. It will be appreciated by one skilled in the art that the particular arrangements illustrated in the drawings are merely exemplary and are not to be considered as limiting of the scope of the invention or the claims herein in any way. While the following figures depict an embodiment where the retractable arm is bistable and employs an FPC, such details are illustrative and should not be construed as limiting. Other retractable-arm mechanisms and flexible conductors may be substituted without departing from the scope of the invention.

DETAILED DESCRIPTION

Figure 1A:
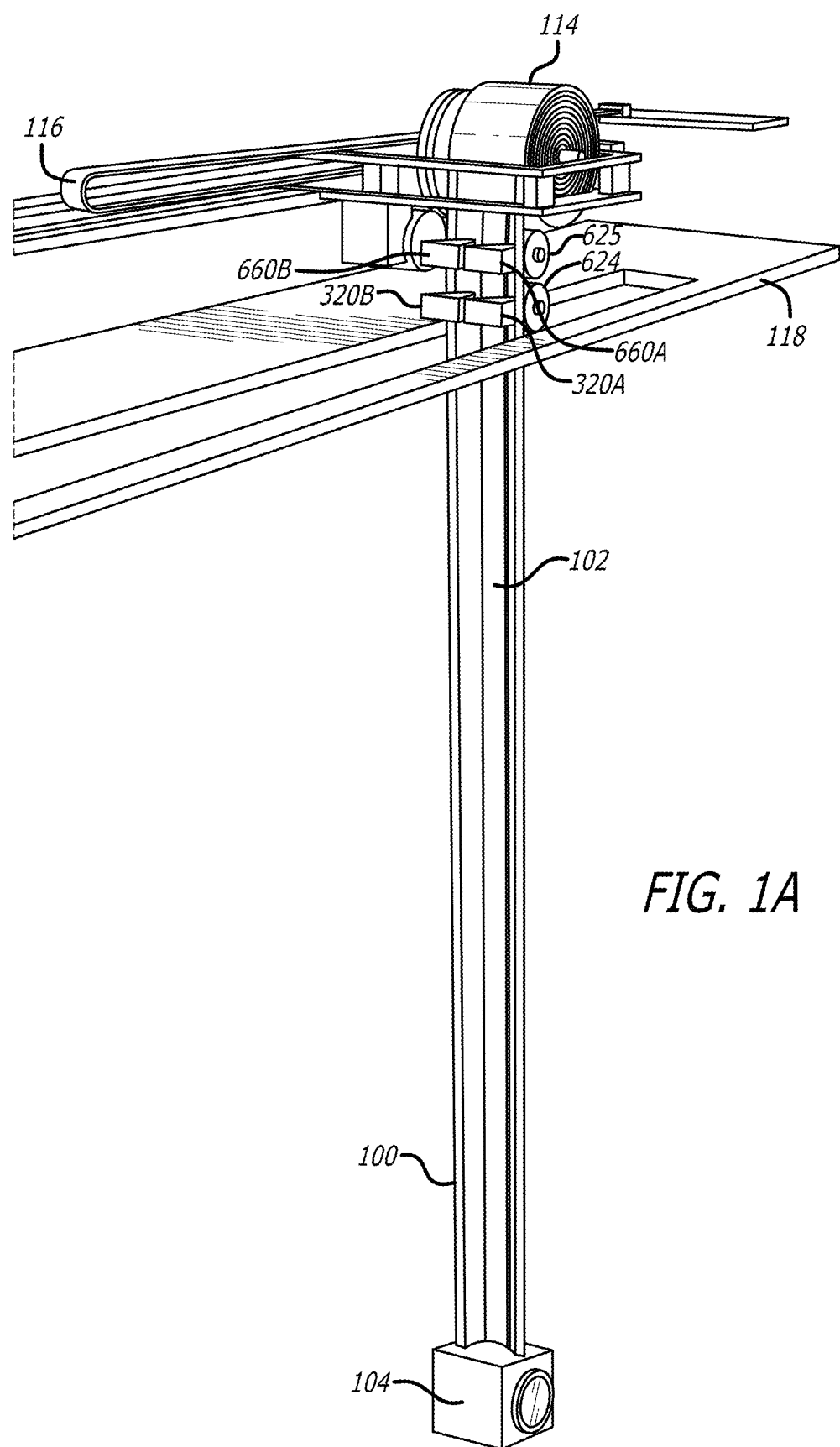
FIG. 1A illustrates a perspective view of the bistable retractable arm in the extended position in accordance with various embodiments.

The embodiments described herein relate to an apparatus comprising a retractable arm configured with a flexible conductor for maintaining continuous electrical connectivity between a modular device and a main printed circuit board (PCB). The apparatus is operable to extend and retract the arm, in some embodiments provide structural rigidity when extended, and enable compact storage when retracted. In various embodiments, the apparatus may accommodate modular devices such as cameras, sensors, microphones, speakers, lighting modules, or integrated active surfaces. The apparatus may include a rotary joint assembly or other connection mechanisms to facilitate rotational movement of the modular device while maintaining electrical connectivity. The disclosed embodiments enable versatile deployment in consumer electronics, robotics, surveillance systems, and other devices requiring a compact, extendable arm for modular components.

It will be understood that references to "bistable" or "FPC" throughout are illustrative only and are not intended to limit the invention to those configurations. The techniques described herein may be practiced with any retractable or resilient-arm arrangement and any suitable flexible conductors.

One or more different embodiments may be described in the present application. Further, for one or more of the embodiments described herein, numerous alternative arrangements may be described; it should be appreciated that these are presented for illustrative purposes only and are not limiting of the embodiments contained herein or the claims presented herein in any way. One or more of the arrangements may be widely applicable to numerous embodiments, as may be readily apparent from the disclosure. In general, arrangements are described in sufficient detail to enable those skilled in the art to practice one or more of the embodiments, and it should be appreciated that other arrangements may be utilized and that structural, logical, software, electrical and other changes may be made without departing from the scope of the embodiments. Particular features of one or more of the embodiments described herein may be described with reference to one or more particular embodiments or figures that form a part of the present disclosure, and in which are shown, by way of illustration, specific arrangements of one or more of the aspects. It should be appreciated, however, that such features are not limited to usage in the one or more particular embodiments or figures with reference to which they are described. The present disclosure is neither a literal description of all arrangements of one or more of the embodiments nor a listing of features of one or more of the embodiments that must be present in all arrangements.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible embodiments and in order to more fully illustrate one or more embodiments. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the embodiments, and does not imply that the illustrated process is preferred. Also, steps are generally described once per aspect, but this does not mean they must occur once, or that they may only occur once each time a process, method, or algorithm is carried out or executed. Some steps may be omitted in some embodiments or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various embodiments in which, for example, functions may be executed out of order from that shown or discussed, including substantially concurrently or in reverse order, depending on the functionality involved, as would be understood by those having ordinary skill in the art.

The detailed description set forth herein in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

FIG. 1A illustrates an embodiment of an apparatus comprising a bistable retractable arm 100 (referred to herein as one exemplary embodiment) integrated with a flexible conductor 102 such as a flexible printed circuit (FPC) for maintaining continuous electrical connectivity between a modular device 104 and a housing 114. It should be understood that reference numbers are carried over between figures for similar components for purposes of simplicity of explanation, but such usage should not be construed as a limitation on the various embodiments unless otherwise stated.

As shown, the bistable retractable arm 100 is in the extended position, demonstrating its structural rigidity and stability. The arm 100 is operable to extend, retract, and maintain a position between a first position and a second position (e.g., between fully extended and fully retracted states). This operability allows the apparatus to adapt to a wide range of scenarios, including precise positioning of the modular device 104 at varying distances from the housing 114, enabling dynamic interaction with the surrounding environment or target objects.

In various embodiments, the operation of the bistable retractable arm 100 may be managed by a central controller, which is operable to process input signals, generate control commands, and coordinate movement of the arm 100 and the modular device 104. As used herein, a central controller refers to one or more processors, microcontrollers, or computing devices configured to execute control algorithms and process data received from sensors, external inputs, or user commands. The central controller may include an integrated processing unit, such as a microprocessor or application-specific integrated circuit (ASIC), or may be implemented in software executed by a general-purpose computing device.

The location of the central controller may vary based on system requirements. In some embodiments, the controller is fully integrated within the apparatus, where all processing occurs locally within the housing 114, allowing the system to operate independently of external computing resources. In other embodiments, the controller may be external to the apparatus and implemented on a connected computing device that receives data from the apparatus and executes control functions remotely. In certain configurations, the controller may be distributed between the apparatus and an external system, where real-time control operations occur locally while higher-level processing is executed remotely. The selection of controller placement may depend on factors such as processing load, response time constraints, and network availability.

Sensor placement within the system may also vary based on implementation needs. Sensors may be positioned along the deployment rail 116 to monitor movement and detect obstructions, within the housing 114 to provide internal system feedback, or integrated into the modular device 104 to enable localized data collection for functions such as object detection, environmental sensing, or automated positioning adjustments. These sensors provide data to the central controller, enabling dynamic adjustments to the movement and positioning of the bistable retractable arm 100 and the modular device 104 based on real-time operating conditions.

In certain embodiments, the central controller or an external computing device is operable to perform AI-based processing of input data to dynamically adjust the operation of the bistable retractable arm 100 and modular device 104. AI-based processing may involve trained machine learning models, computer vision algorithms, and predictive analytics techniques that analyze sensor data, external API signals, and user input.

Machine learning models may be trained using data collected from the apparatus, including movement parameters, sensor feedback, and operational conditions, enabling adaptive decision-making for optimizing positioning and movement patterns. In some embodiments, the AI system processes external inputs, such as API data from third-party applications, to adjust the modular device's orientation dynamically. For example, in a video conferencing scenario, AI-based processing may analyze screen content to determine the optimal positioning of a camera module based on detected participants. The AI system may also incorporate predictive modeling to anticipate user movements or environmental changes, optimizing positioning in real time.

The AI system may be implemented as a local inference engine running on the apparatus, as a cloud-based processing system communicating with the apparatus, or as a hybrid system where AI inference occurs on the device while training and refinement occur externally. When AI-based decision-making is performed externally, the external computing device may receive sensor data from the apparatus, process it using trained models, and return optimized control signals to adjust the apparatus's positioning and movement.

The curvature elements 320A and 320B are shown along the bistable retractable arm 100. In an embodiment, curvature elements 320A and 320B are operable to contribute to the structural stability when extended. In various embodiments, curvature elements 320A and 320B can be shaped to provide controlled curvature while maintaining clearance for the flexible conductor 102, ensuring smooth operation while allowing the arm 100 to transition between two stable positions. Curvature elements 320A and 320B can include, for example, molded structural supports, flexible tensioning ribs, low-friction rollers, wheels, or guided tracks configured to maintain curvature and stability. A more detailed discussion of curvature elements is provided in FIG. 3A and FIG. 3B.

In various embodiments, the bistable retractable arm 100 may be constructed from materials such as spring steel, flexible polymer composites, carbon fiber, or other resilient materials capable of bistable operation. The arm 100 may include a convex curvature that provides the necessary stiffness when extended and allows the arm 100 to coil compactly when retracted.

In an embodiment, the flexible conductor 102 may be integrated along the length of the arm 100, enabling continuous electrical connectivity between the modular device 104 and internal components within the housing 114. The flexible conductor 102 may alternatively be implemented using ribbon cables, flex PCBs, or other flexible conductive pathways, depending on the specific design and manufacturing requirements. The FPC 102 is operable to endure repeated extension and retraction of the arm 100 without degradation of performance.

The modular device 104 is positioned at the distal end of the arm 100 and may include, but is not limited to, cameras, sensors, microphones, speakers, lighting modules, or other electronic assemblies. In certain embodiments, the modular device 104 may be a detachable or replaceable component, allowing for modular upgrades and customization based on specific use cases. The connection between the modular device 104 and the flexible conductor 102 may be achieved using connectors, soldered joints, or other suitable electrical coupling mechanisms.

The housing 114 may take various forms, such as a device enclosure, a mounting bracket, or an integrated component of a larger system. The housing 114 may be constructed from plastic, metal, composite materials, or any other suitable material that provides structural support and protection for the internal components of the apparatus. In some embodiments, the housing 114 may include access points or service panels to facilitate maintenance and replacement of components.

The arm 100 is operable to traverse along a deployment rail 116 and 118, which is mechanically associated with the housing and provides a structural guide for the horizontal positioning of the bistable retractable arm 100. The deployment rail defines a constrained path along which the retractable arm moves relative to the housing, ensuring controlled horizontal alignment.

The apparatus is designed for use in a variety of contexts, including but not limited to consumer electronics, robotics, surveillance systems, and any application requiring a compact, extendable arm for modular components. The described embodiments are merely examples and do not limit the scope of the disclosure, as alternate materials, components, and configurations may also be implemented in accordance with the present embodiments.

Figure 1B:
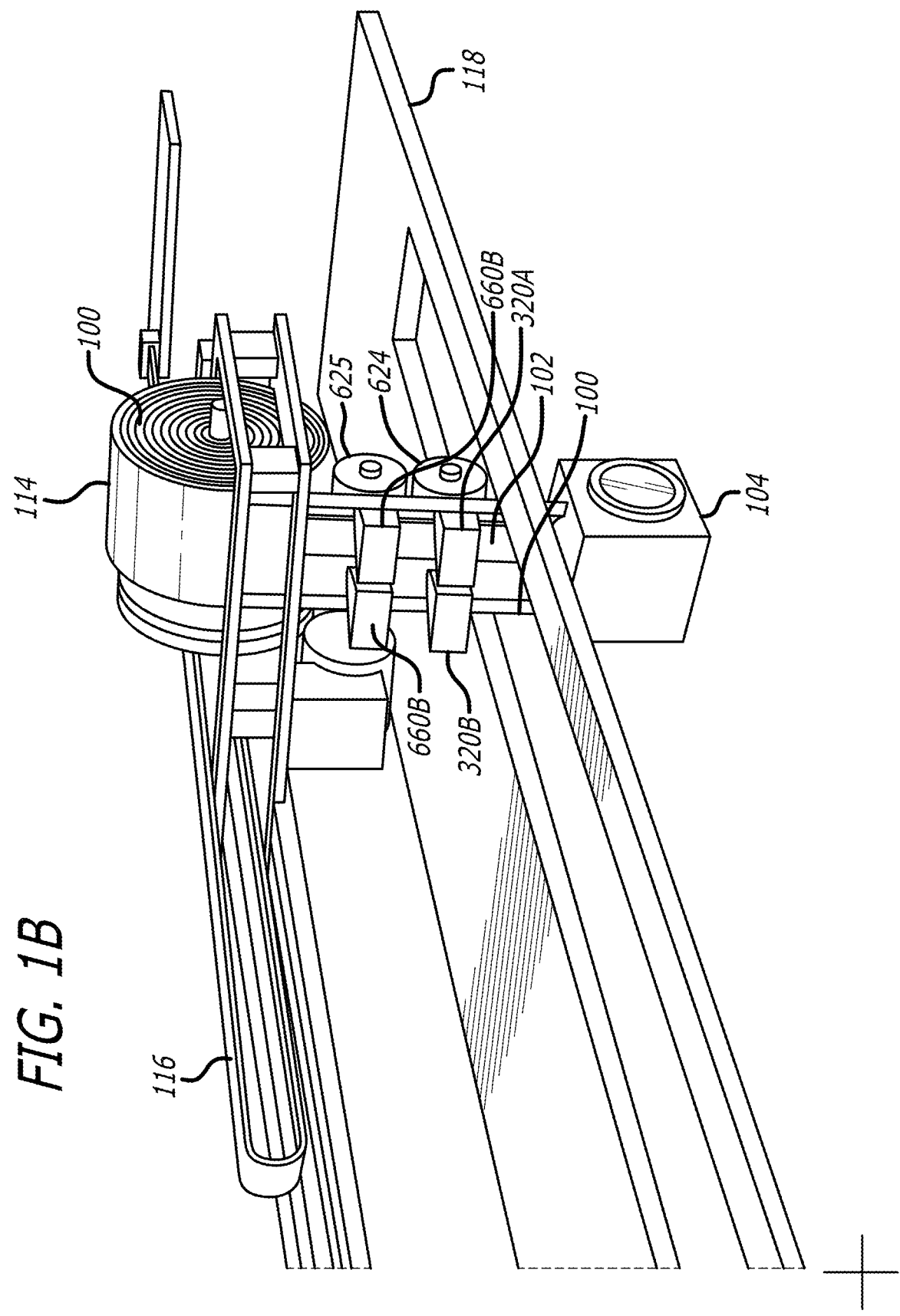
FIG. 1B illustrates a perspective view of the bistable retractable arm in the retracted position in accordance with various embodiments.

While FIG. 1A illustrates the bistable retractable arm 100 in the extended position, demonstrating its structural rigidity and precise positioning capabilities, FIG. 1B shows the apparatus in the retracted position. The arm 100 is operable to retract fully into a compact form, coiling within or adjacent to the housing 114 and minimizing space usage when not in operation. In an embodiment, the compactness achieved in the retracted position is particularly advantageous in applications where space is limited, such as in consumer electronics, robotics, and portable devices. Curvature elements 320A and 320B further contribute to the controlled retraction of the bistable retractable arm 100 by influencing its shape and stability during movement.

As shown in FIG. 1B, the modular device 104, which may include cameras, sensors, microphones, speakers, or lighting modules, is positioned close to the housing 114, providing protection and a reduced profile. The flexible conductor 102 maintains continuous electrical connectivity between the modular device 104 and internal components within the housing 114, even when the arm 100 is fully retracted.

The deployment rails 116 and 118 provide structural alignment and stability for the retractable arm 100. The deployment rails define a structural path for alignment and lateral stability. Movement along this path may be driven by separate mechanical components.

The apparatus is operable to transition between any intermediate positions along the deployment rails 116 and 118, allowing for adjustable positioning of the modular device 104 based on operational needs. The addition of support element 660B further stabilizes the movement and alignment of the bistable retractable arm 100 as it retracts into the housing 114. The described embodiments highlight the versatility and adaptability of the apparatus, providing a robust solution for dynamic environments and modular component deployment.

Figures 2A, 2B:
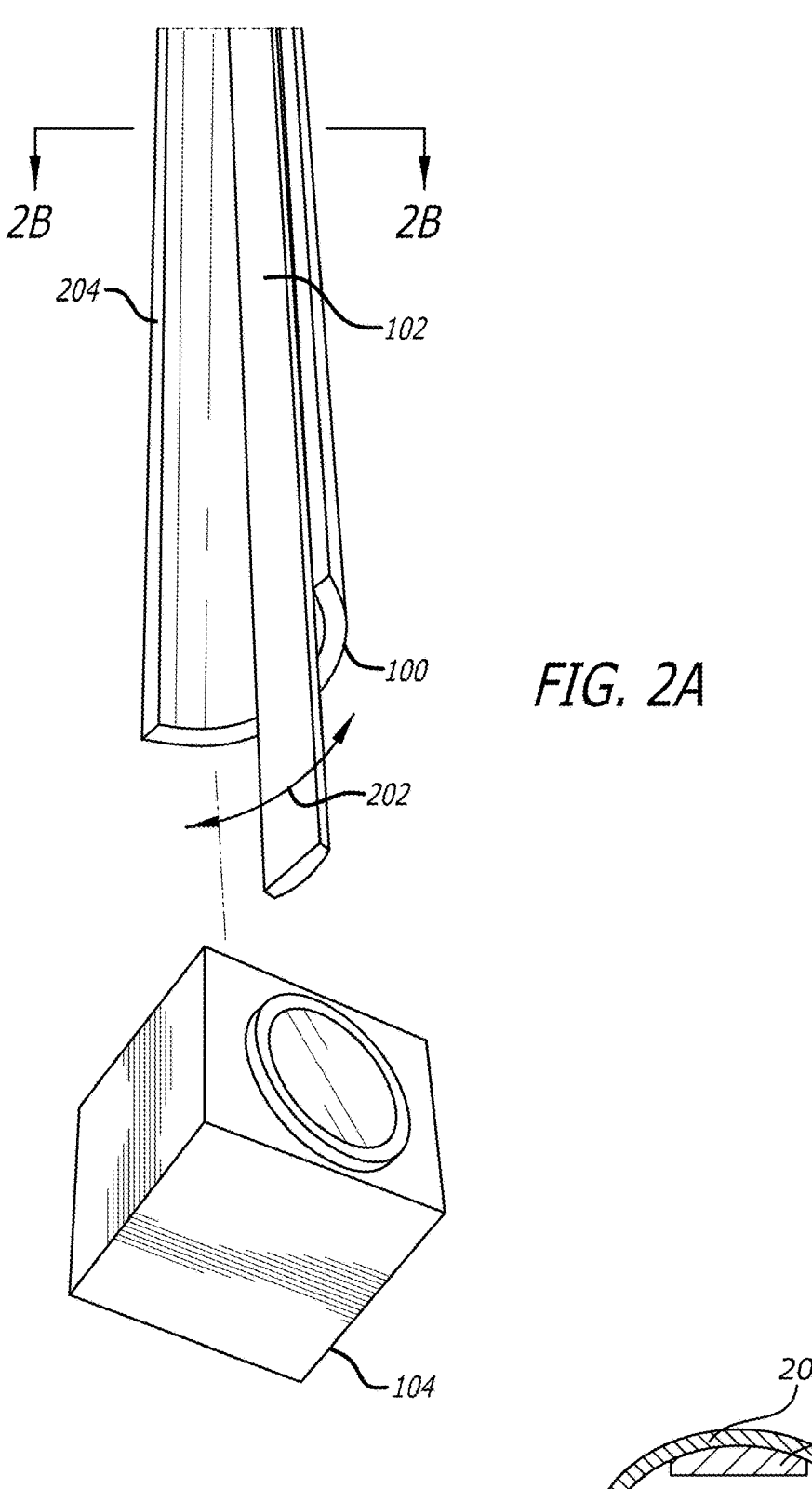
FIG. 2A is a cross-sectional view showing how the curvature structure provides rigidity to the bistable retractable arm when extended in accordance with various embodiments.
FIG. 2B illustrates configurations for integrating electrical connectivity within the bistable retractable arm.

FIG. 2A is a cross-sectional view illustrating an embodiment of the apparatus where the bistable retractable arm 100 includes a curvature structure 202 that provides rigidity when the arm is in the extended state. The curvature structure 202 comprises a convex form that enhances the structural integrity of the arm 100, allowing it to support a modular device 104 with minimal deflection or vibration.

The rigidity of the arm 100 can be quantified using a rigidity coefficient (K), which may vary based on the extension length, material properties, applied voltage, or curvature. In certain embodiments, the rigidity of the arm 100 may also be influenced by a curvature-dependent rigidity coefficient (Kc), where $Kc=f(C)$ and C represents the curvature factor. Adjusting the curvature 202 can dynamically alter Kc, providing greater control over the arm's stiffness.

In embodiments using spring steel or polymer composites, the rigidity coefficient K may increase proportionally with the arm's extension, providing enhanced stability at greater lengths. In embodiments utilizing electroactive materials, such as shape-memory alloys or electroactive polymers, the rigidity coefficient K may dynamically adjust when a specific voltage or current is applied, enabling controlled stiffness or flexibility.

In certain embodiments, the rigidity of the arm 100 may be achieved through a combination of physical extension and electrical activation. For example, the arm 100 may extend to a specific length while an applied voltage to the curvature structure 202 increases its rigidity, optimizing performance for specific operational scenarios. This dual-modality approach allows for fine-tuning of the arm's stiffness based on the requirements of the attached modular device 104.

The material layers or coatings 204 integrated into the arm 100 may include multi-layer composites, adaptive polymers, or coatings that respond to environmental conditions. These layers contribute to the arm's durability, resistance to wear, and ability to flex or stiffen as needed. The materials may include coilable elements that enable the arm to transition smoothly into a compact form while maintaining performance characteristics.

Additional factors influencing the rigidity of the arm 100 may include integrated tensioning mechanisms, temperature-responsive materials, magnetic influences, and mechanical locking systems. The rigidity may be further enhanced through a tensioning coefficient (T), where increased tension along the arm's length improves stability under load.

In certain embodiments, the arm 100 may incorporate tensioning elements, such as internal cables, springs, or pneumatic actuators, that apply force along the length of the arm. These elements may work in conjunction with the curvature structure 202, allowing the apparatus to fine-tune the rigidity coefficient K for specific scenarios.

Materials used in the arm 100 and curvature structure 202 may include temperature-responsive polymers, which adjust flexibility based on thermal input. By integrating heating elements or utilizing external temperature changes, the apparatus can transition between flexible and rigid states dynamically.

The inclusion of magnetorheological (MR) or electrorheological (ER) fluids within the material layers 204 provides another modality for rigidity control. When subjected to a magnetic or electric field, these fluids alter their viscosity, effectively changing the stiffness of the arm 100 in real time.

Additionally, mechanical locking systems, such as ratcheting or cam-lock mechanisms, may secure the arm 100 in a rigid state when fully extended. These locks may engage automatically or be activated manually, providing structural support for the modular device 104 during operation.

FIG. 2B illustrates various configurations for integrating electrical connectivity within the bistable retractable arm 100. The bistable retractable arm 100 includes integrated electrical conduits 206 for maintaining electrical connectivity, which may be implemented using a flexible conductor such as a flexible printed circuit (FPC), etched conductive traces, embedded wiring, or material deposition techniques. These integrated conduits eliminate the need for additional layers while enabling uninterrupted electrical connections between modular devices 104 and system components.

In some embodiments, the flexible conductor 102 is laminated or bonded to the bistable retractable arm 100, following its curvature to accommodate repeated extension and retraction. In alternative configurations, conductive traces may be etched directly onto the surface of the bistable retractable arm 100 using chemical or laser-based processes, forming an embedded electrical pathway without requiring an additional flexible conductor layer.

Another configuration includes embedded wiring within the bistable retractable arm 100, where conductive elements are enclosed within polymer or composite material layers 208. This integration enhances durability while maintaining flexibility.

The described configurations support various applications, including power transmission, signal transfer, and communication between modular devices 104 and internal circuitry housed within the apparatus. The integration of electrical conduits 206 within the bistable retractable arm 100 provides a compact and efficient approach to maintaining continuous connectivity without requiring externally routed cables or additional wiring layers.

Figure 3A:
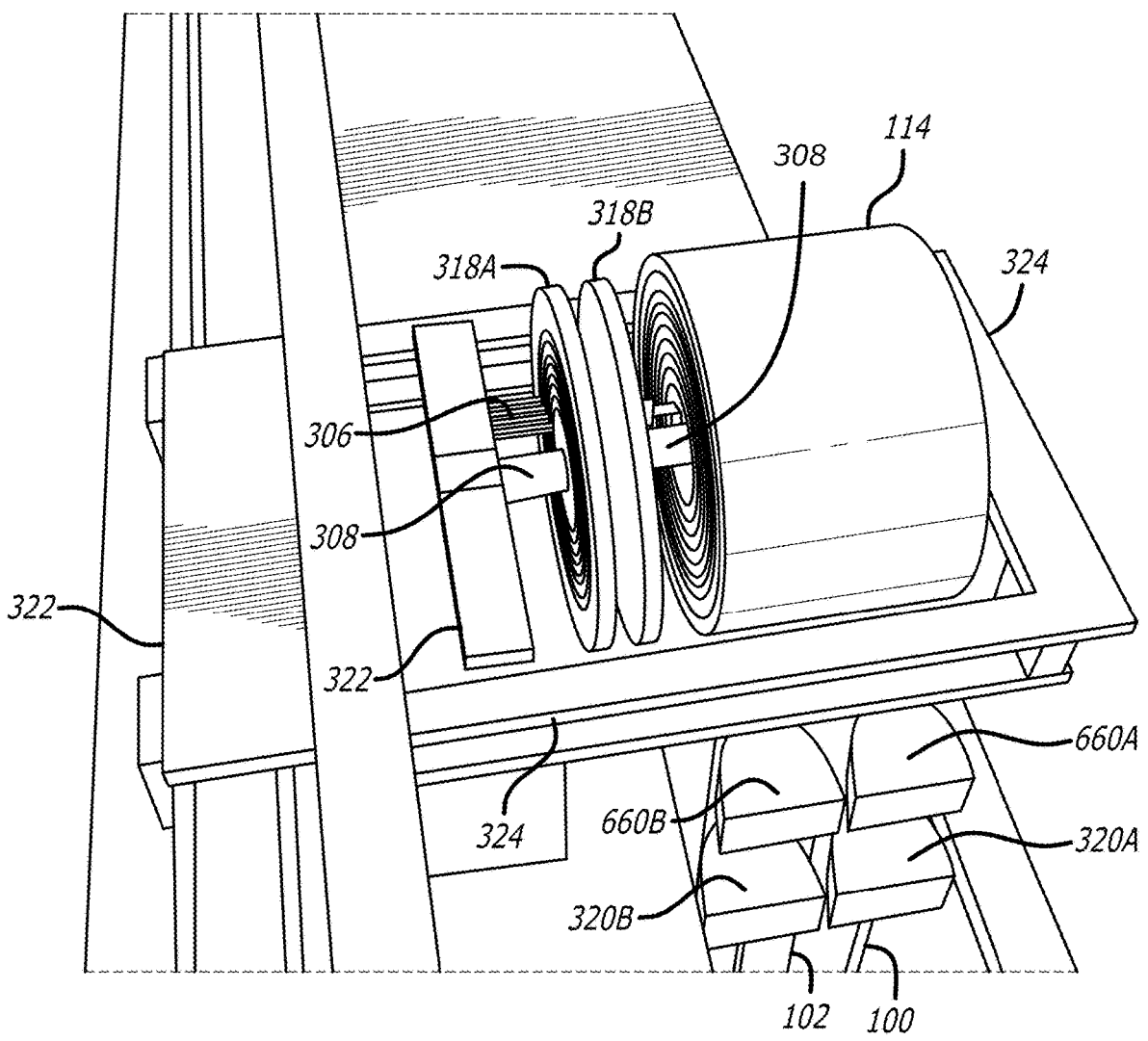
FIG. 3A and FIG. 3B illustrate cross-sectional views of the integrated FPC and rotary joint assembly, showing electrical connectivity during rotation of the bistable retractable arm in accordance with various embodiments.
Figure 3B:
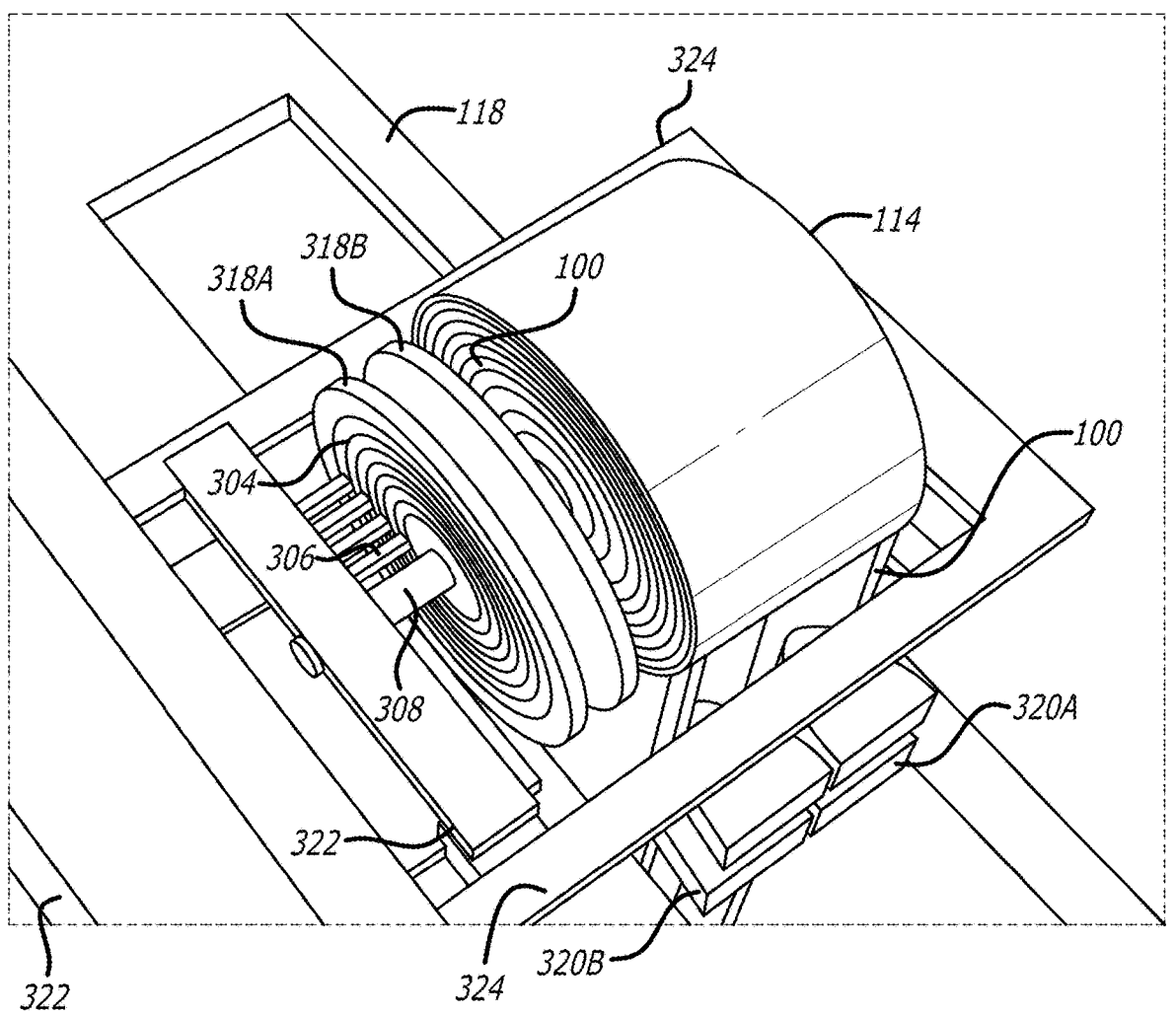

FIG. 3A and FIG. 3B illustrate cross-sectional views of an embodiment of the apparatus, focusing on the flexible conductor 102 such as an integrated flexible printed circuit (FPC) and rotary joint assembly in accordance with an embodiment. As shown in FIG. 3A and FIG. 3B, the rotary joint assembly (also known as a slip ring) includes rotary traces 304, spring-loaded contacts 306, pivot point 308, and the modular support and track assembly, which comprises track mount 322 and stabilizing structure 324. Curvature elements 320A, 320B, 660A, and 660B are also illustrated, which contribute to the bistable nature of the arm by providing controlled extension and retraction characteristics. FIG. 3A and FIG. 3B provide complementary perspectives, demonstrating how continuous electrical connectivity is maintained during rotation of the bistable retractable arm 100 (referred to herein as one exemplary embodiment) within the housing 114.

The modular support and track assembly is configured to enable rotational movement of the bistable retractable arm 100 while preserving electrical connectivity through the flexible conductor 102. The rotary traces 304 are arranged concentrically around the pivot point 308, interfacing with the spring-loaded contacts 306 to maintain consistent signal and power transmission during rotation. This configuration ensures that the modular device (not shown in FIG. 3A or FIG. 3B) can operate without interruption, regardless of the arm's rotational position.

The bistable retractable arm 100 is mechanically, electrically, or otherwise associated with or connected to the modular support and track assembly through a series of rotational interfaces 318A, 318B. These interfaces may include bearings, bushings, or keyed shafts that provide secure and controlled rotational movement. In certain embodiments, the mechanical linkage may utilize a splined shaft and hub configuration, where the bistable retractable arm 100 includes splines that mate with corresponding grooves in the track mount 322, allowing torque transfer while permitting rotation.

The curvature elements 320A, 320B, 660A, and 660B contribute to the bistable nature of the bistable retractable arm 100, enabling it to transition between extended and retracted positions while providing structural stability. These elements may be constructed from spring steel, flexible polymer composites, or electroactive materials that adjust rigidity based on applied voltage or mechanical force. The curvature elements 320A, 320B, 660A, and 660B are mechanically, electrically, or otherwise associated with or connected to the bistable retractable arm 100 and the modular support and track assembly using fasteners, adhesives, or integrated molding techniques, ensuring a robust and durable connection. Additional discussion of the role of curvature elements 660A and 660B will be provided in FIG. 6.

The housing 114 is configured as an enclosure and as a rotational chamber for the bistable retractable arm 100. The bistable retractable arm 100 is operable to rotate within the housing 114, with the deployment rail 116 providing a guided path for controlled movement. The modular support and track assembly, which integrates with the deployment rail 116, offers mechanical stability and ensures the bistable retractable arm 100 remains aligned and secure during operation. These support structures may include linear bearings, guide wheels, or track systems that maintain precise positioning of the bistable retractable arm 100.

During operation, the apparatus shown in FIG. 3A and FIG. 3B is operable to maintain continuous electrical connectivity during the rotation of the bistable retractable arm 100 through the integration of the flexible conductor 102 and rotary joint assembly (also known as a slip ring). The rotary traces 304, which are concentrically arranged around the pivot point 308, interact with the spring-loaded contacts 306 to ensure uninterrupted electrical signals are transmitted between the modular device (not shown) and the internal circuitry within the housing 114.

As the bistable retractable arm 100 rotates within the housing 114, the rotational interfaces 318A, 318B maintain secure contact with the rotary traces 304. This interaction allows for rotation while simultaneously extending or retracting the bistable retractable arm 100 along the deployment rail 116, without compromising electrical connectivity or mechanical stability.

The curvature elements 320A, 320B, in various embodiments, contribute to the functional performance of the bistable retractable arm 100. By providing bistable functionality, these elements allow the bistable retractable arm 100 to remain rigid when extended and to coil compactly when retracted. The materials used in the curvature elements, such as electroactive polymers, enable dynamic control over rigidity through applied voltage, allowing the bistable retractable arm 100 to adapt to different operational scenarios.

The deployment rail 116 guides the movement of the bistable retractable arm 100 along a predefined path. The modular support and track assembly may provide mechanical stability by holding components securely in place. These components work in conjunction to maintain the arm's alignment and ensure controlled operation during extension, retraction, and rotation.

The apparatus is designed for use in a variety of contexts, including consumer electronics, robotics, surveillance systems, and other modular component deployment scenarios. The combination of rotational functionality, bistable stability, and continuous electrical connectivity allows for a wide range of applications where precise positioning and reliable signal transmission are operational requirements.

Figure 4:
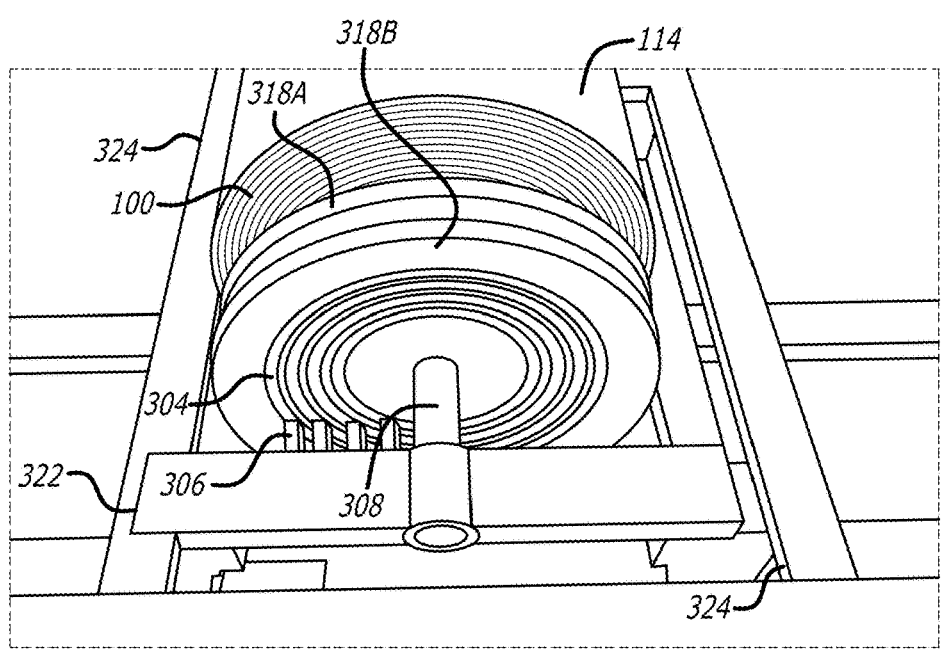
FIG. 4 is a diagram of the rotary traces and spring-loaded contact system, focusing on the rotary electrical connection within the rotary joint assembly in accordance with various embodiments.

FIG. 4 is a diagram of the rotary traces and spring-loaded contact system, focusing on the rotary electrical connection within the rotary joint assembly (also known as a slip ring) in accordance with an embodiment. As shown in FIG. 4, the rotary joint assembly includes rotary traces 304, spring-loaded contacts 306, pivot point 308, rotational interfaces 318A, 318B, the modular support and track assembly, housing 114, and the bistable retractable arm 100 in its coiled form. FIG. 4 illustrates how concentric circular copper pads on the main PCB (rotary traces 304) interact with spring-loaded contacts 306 to maintain continuous electrical connectivity during rotation of the bistable retractable arm 100.

The rotary traces 304 are mechanically, electrically, or otherwise associated with or connected to the spring-loaded contacts 306, which are held within the modular support and track assembly. The spring-loaded contacts 306 maintain surface contact with the rotary traces 304 through spring tension, allowing for consistent electrical transmission during rotation.

The modular support and track assembly is connected to the pivot point 308 using bearings or bushings, providing a stable rotational axis for the bistable retractable arm 100. The pivot point 308 is further linked to the rotational interfaces 318A, 318B through a splined shaft and hub configuration, ensuring that as the bistable retractable arm 100 rotates, electrical connectivity is maintained through continuous contact with the rotary traces 304.

The rotational interfaces 318A, 318B are mechanically connected to the bistable retractable arm 100, allowing for 360-degree rotation while the arm remains mechanically secured and electrically connected. These interfaces may include bearings, bushings, keyed shafts, or splined configurations, contributing to controlled rotational movement and secure mechanical connections. The bistable retractable arm 100 is housed within the housing 114, which is connected to the stabilizing structure 324 via fasteners, integrated molding, or adhesive techniques. The stabilizing structure 324 holds the housing 114 in place, maintaining mechanical stability and alignment during rotation and retraction of the bistable retractable arm 100.

During operation, the rotary joint assembly enables the bistable retractable arm 100 to rotate 360 degrees while maintaining continuous electrical connectivity through the flexible conductor 102 (not shown in FIG. 4). The rotary traces 304, arranged concentrically around the pivot point 308, interact with the spring-loaded contacts 306 to ensure uninterrupted transmission of power and signals to the modular device (not shown).

As the rotational interfaces 318A, 318B rotate, they maintain secure contact with the rotary traces 304, enabling dynamic positioning of the bistable retractable arm 100 while preserving electrical continuity. The modular support and track assembly, including the stabilizing structure 324, holds the housing 114 and rotary components securely in place, minimizing vibration and mechanical stress during rotation and extension/retraction of the bistable retractable arm 100.

In certain embodiments, the rotary joint assembly may include alternative components such as slip rings, conductive brushes, or contactless inductive couplers to achieve similar electrical connectivity as the rotary traces 304 and spring-loaded contacts 306. Additionally, the modular support and track assembly may incorporate linear bearings, guide wheels, or magnetic guidance systems to reduce friction and enhance the precision of the bistable retractable arm 100's movement.

Figure 5:
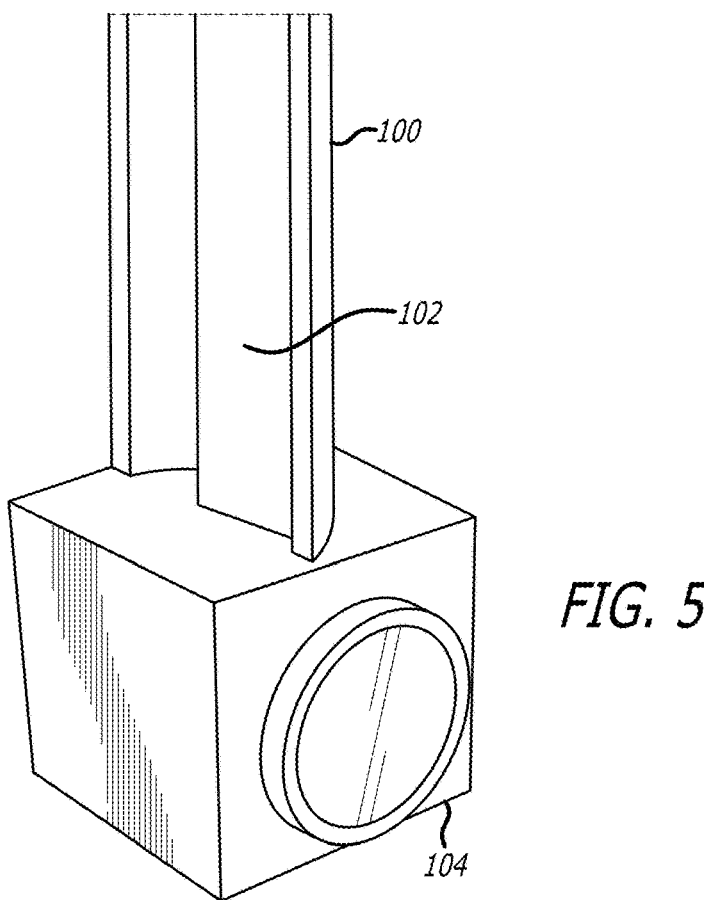
FIG. 5 is a side view of the bistable retractable arm with a modular device attached in accordance with various embodiments.

FIG. 5 is a side view of an embodiment of the apparatus, illustrating the bistable retractable arm 100 (referred to herein as one exemplary embodiment) with a modular device 104 attached to its distal end. As shown in FIG. 5, the modular device 104 may represent various components, including microphones, sensors, lighting modules, or other modular devices, demonstrating the apparatus's versatility in different application scenarios.

The bistable retractable arm 100 is mechanically, electrically, or otherwise associated with or connected to the modular device 104, providing a stable platform for modular integration. In an embodiment, the flexible conductor, e.g., a flexible printed circuit (FPC), may be routed along the bistable retractable arm 100, ensuring continuous electrical connectivity to the modular device 104. The flexible conductor 102 is shown as integrated within the structure of the bistable retractable arm 100, contributing to a compact design that supports various modular devices.

In an embodiment, the modular device 104 may be removable or replaceable, allowing for dynamic adaptation to different operational requirements. The electrical connection between the flexible conductor 102 and the modular device 104 may include plug-in connectors, soldered joints, or spring-loaded contacts, enabling modular compatibility with different device types. In certain embodiments, the apparatus is operable to accommodate modular devices including cameras, sensors, microphones, speakers, lighting modules, or integrated active surfaces. Integrated active surfaces may include embedded LED arrays, capacitive touch sensors, proximity sensors, antennas, transmitters, receivers, or other electronic functionalities directly integrated into the surface of the retractable arm itself.

During operation, the bistable retractable arm 100 is operable to extend and retract, positioning the modular device 104 as needed. The flexible conductor 102 ensures uninterrupted electrical connectivity, allowing the modular device 104 to function properly regardless of the arm's position.

The modular device 104 may include sensors for data collection, lighting modules for illumination, microphones for audio capture, or other devices that require stable positioning and reliable electrical connectivity. The flexible conductor 102 may be adapted to support different data types, including analog signals, digital communications, or power transmission, depending on the operational requirements.

Figure 6:
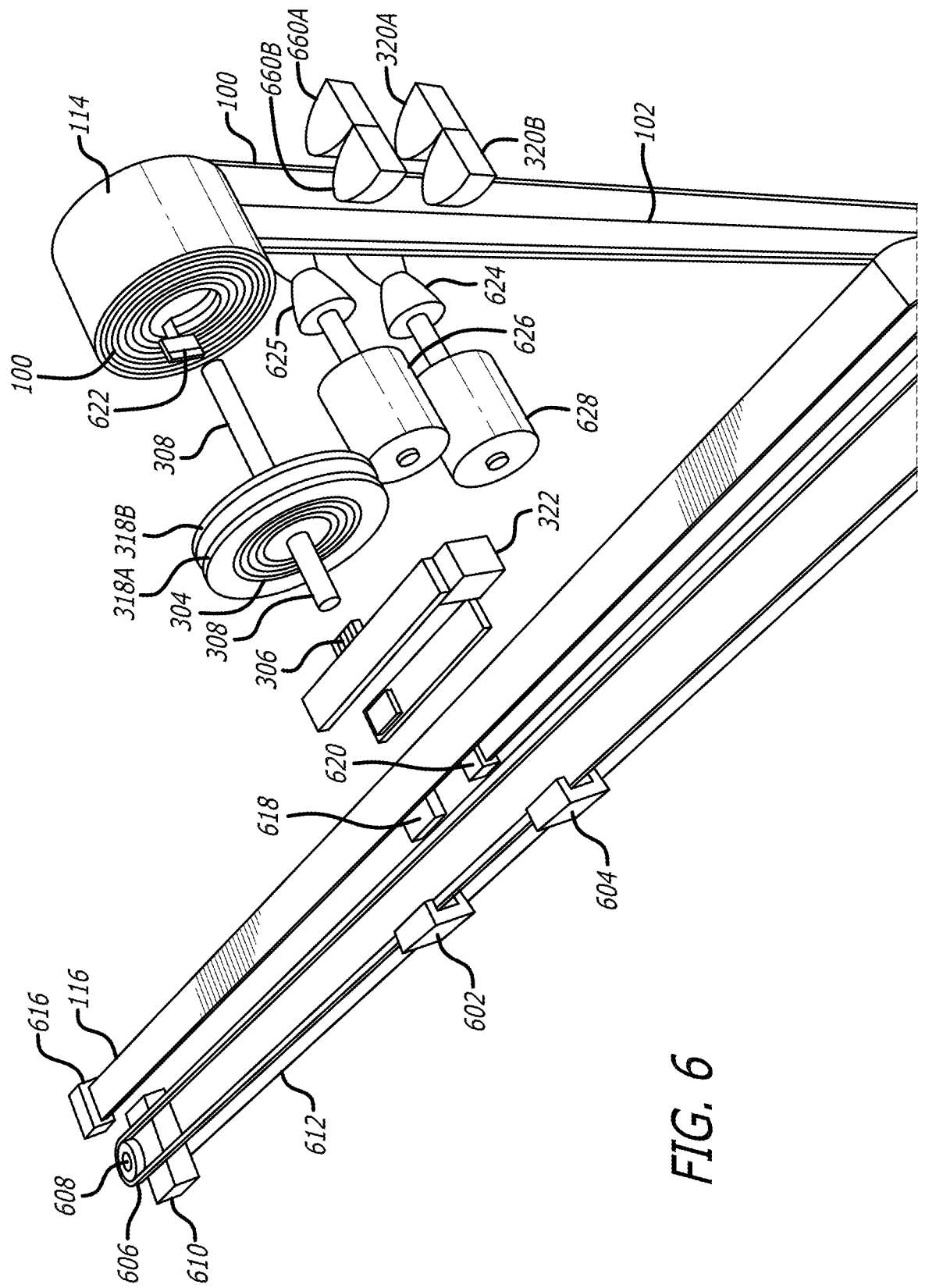
FIG. 6 is an exploded view of the retractable bistable arm assembly, illustrating the integration of components, including the bistable retractable arm, FPC, rotary traces, and modular device interface in accordance with various embodiments.

FIG. 6 is an exploded view of the retractable bistable arm assembly, illustrating the integration of components, including the bistable retractable arm 100 (referred to herein as one exemplary embodiment), flexible conductor 102, rotary traces 304, and modular device interface. As shown in FIG. 6, the exploded view provides a detailed perspective on how the components connect and operate together within the apparatus.

The bistable retractable arm 100 is mechanically, electrically, or otherwise associated with or connected to the housing 114, enabling extension and retraction along a defined path of movement. Horizontal positioning along the horizontal movement track 612 is driven by mechanical components, including the track mount 322, belt drive pulley 608, belt 606, and motor 628.

The modular support and track assembly includes a track mount 322 mechanically connected to the horizontal movement track 612, providing a sliding interface for controlled horizontal movement. Movement of the track mount 322 along the horizontal movement track 612 is driven by the belt 606 and belt drive pulley 608, controlled by motor 628. Clamp components 602, 604, and stopper 616 function as guides and mechanical limits, ensuring precise alignment and stable positioning along the horizontal movement track 612. The deployment rail 116 provides structural alignment and lateral stability for the retractable arm 100 throughout this movement.

The motor 628 controls the rotation of the rubber roller 624, driving the bistable retractable arm 100 between extended and retracted positions. When the rubber roller 624 rotates in a first direction, the arm 100 extends outward, and when rotated in the opposite direction (e.g., a second direction), the arm retracts into the housing 114. In an embodiment, a locking device, such as a mechanical cam-lock, ratchet system, or electromechanical actuator, may secure the arm 100 in an extended or retracted position. Additionally, a secondary roller 625 may be positioned opposite curvature elements 660A and 660B, applying balanced pressure during arm extension and retraction to maintain alignment and stability.

A secondary motor 626 may be operable to drive secondary roller 625, working in conjunction with primary motor 628, which controls roller 624. In certain embodiments, one or both motors may be activated based on operational requirements. In some configurations, both motors may operate simultaneously to provide uniform force distribution along the bistable retractable arm 100, particularly beneficial when extending the arm in a controlled manner at variable speeds. In other configurations, only one motor may be active at a given time, allowing for staged movement, where motor 626 may engage initially to guide the bistable retractable arm 100 into alignment, and motor 628 may subsequently take over to control retraction. The motors may also dynamically adjust torque and speed based on feedback from tension sensors, ensuring optimal pressure application to the bistable retractable arm 100 during deployment and retraction. In certain situations, one motor may apply greater force than the other, creating a guided bending motion to accommodate specific deployment requirements. These configurations allow for adaptive movement control, improving stability and reliability across different operational scenarios.

Other approaches may also be implemented to achieve stable alignment and controlled deployment of the bistable retractable arm 100. Instead of a secondary roller 625, a tensioning guide or adaptive channel may be incorporated along the movement path to dynamically adjust pressure based on the extension state of the arm. Such a system may utilize adjustable mechanical arms or a spring-loaded track to guide the arm while compensating for changes in diameter during unwinding. For example, in certain embodiments, a set of variable-tension guide rails could be positioned along the movement path, applying controlled resistance using linear actuators or pneumatic dampers. These guide rails would adjust their position in response to the changing diameter of the bistable retractable arm 100, ensuring smooth extension while minimizing lateral drift.

In various embodiments, the path of movement describes the trajectory along which the retractable arm transitions between positions, influenced by curvature elements, guiding structures, or mechanical forces. The horizontal movement track 612 specifically provides a structural rail for driven horizontal translation of the track mount 322, enabling controlled lateral positioning. The deployment rails 116 and 118 separately provide structural alignment, ensuring lateral stability without actively driving the movement.

In an embodiment, the flexible conductor, e.g., a flexible printed circuit (FPC), can be routed along the bistable retractable arm 100, demonstrating a 90° fold to exit the spool at FPC exit bistable surface 622. The flexible conductor 102 is integrated within the structure of the bistable retractable arm 100, contributing to a compact design. The flexible conductor 102 also shows a folded design to minimize visual obstruction, particularly where the flexible conductor 102 connects to the modular device interface. The flexible conductor 102 is electrically connected to the rotary traces 304, which are in continuous contact with spring-loaded contacts 306 to maintain electrical connectivity during rotation and movement.

The rotary traces 304 and spring-loaded contacts 306 are integrated within the rotary joint assembly, providing continuous electrical connectivity as the bistable retractable arm 100 extends and retracts. The pivot point 308 offers a central rotation axis, contributing to controlled rotational movement and stable operation. The rotational interfaces 318A, 318B are mechanically linked to the bistable retractable arm 100, providing secure contact with the rotary traces 304 through the spring-loaded contacts 306.

The curvature elements 320A, 320B contribute to the bistable functionality of the retractable arm 100, allowing the arm to maintain rigidity when extended and coil compactly when retracted.

The modular support and track assembly secures the track mount 322 within the horizontal movement track 612, ensuring alignment and mechanical stability during horizontal movement. For example, when the apparatus is mounted to a tabletop or structural frame, the assembly ensures the retractable arm remains stable and properly aligned during horizontal positioning.

The clamp or clip components 602, 604, 618, and 620 are mechanically associated with the track mount 322, contributing to its controlled horizontal movement along the horizontal movement track 612. These components serve as guides and stabilizers, ensuring alignment, preventing lateral displacement, and facilitating precise positioning. The stopper 616 acts as a mechanical limit, while the end of horizontal track 610 provides structural support.

During operation, the belt drive pulley 608 engages with the belt 606, driving horizontal movement of the track mount 322 along the horizontal movement track 612. The bistable retractable arm 100, connected to the track mount 322, is driven between extended and retracted positions by motor 628 through rotation of the rubber roller. This configuration enables controlled and precise positioning of the modular device.

The flexible conductor 102 maintains uninterrupted electrical connectivity, ensuring the modular device remains operational regardless of the arm's position.

The rotary traces 304 interact with spring-loaded contacts 306, enabling dynamic positioning while preserving electrical continuity. The curvature elements 320A, 320B allow the bistable retractable arm 100 to transition controllably between extended and retracted states, enhancing the apparatus's versatility. The rotational interfaces 318A, 318B rotate with the bistable retractable arm 100, maintaining secure contact with the rotary traces 304, contributing to dynamic positioning and electrical stability.

In various embodiments, the motor 628 and belt 606 may be replaced or modified with alternative components, such as linear actuators, gear systems, or pneumatic drivers, to suit different operational scenarios. The clamp components 602, 604, 618, 620 may also be interchangeable with snap-fit connectors, magnetic mounts, or threaded fasteners, depending on the installation requirements.

Figure 7:
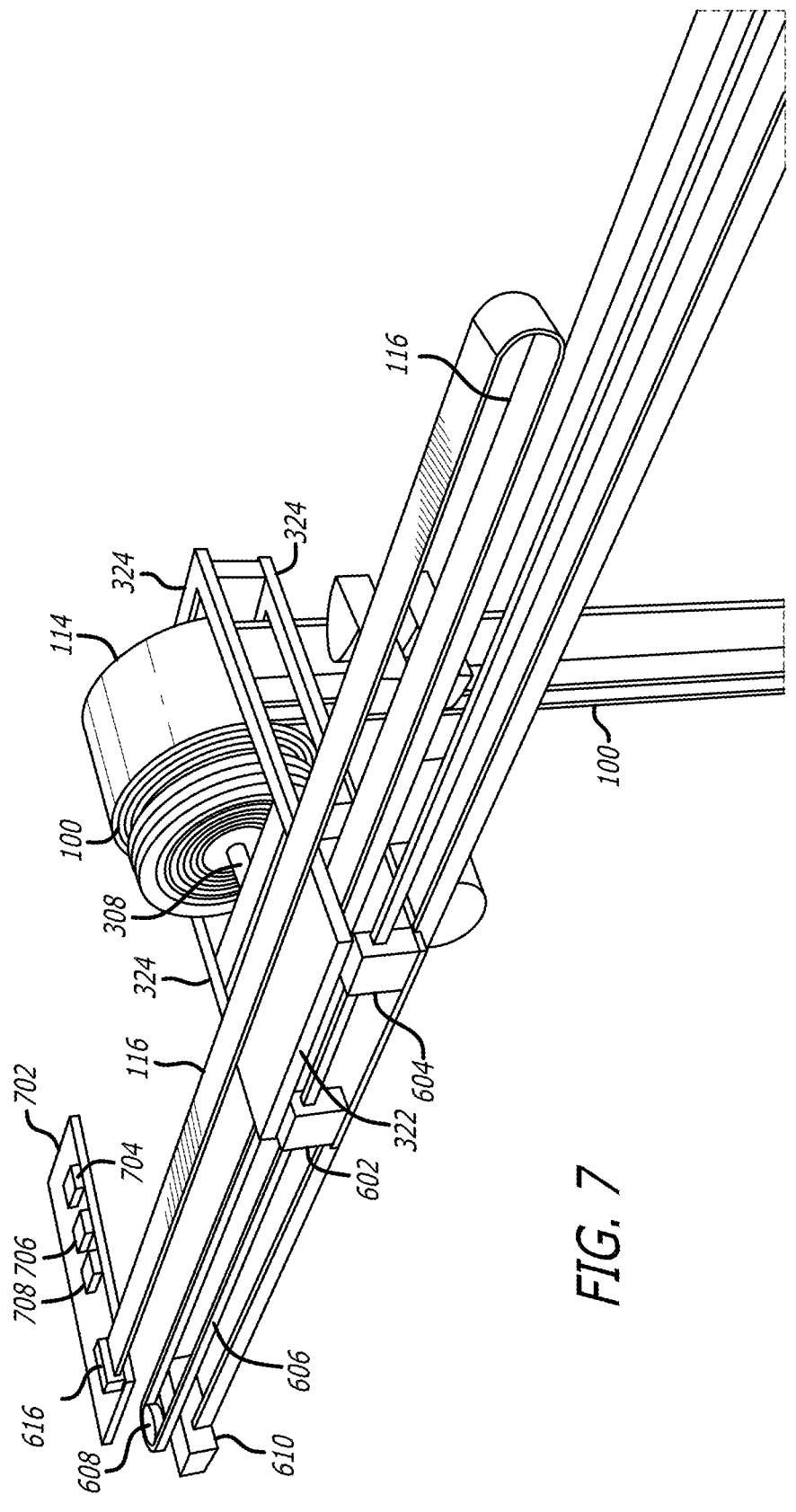
FIG. 7 is a detailed view of the modular support and track assembly, demonstrating the movement of the bistable retractable arm along the horizontal movement track in accordance with various embodiments.

FIG. 7 provides a detailed view of the modular support and track assembly, illustrating the controlled horizontal movement of the track mount 322 along the horizontal movement track 612. The figure highlights the integration of housing 114, stabilizing structure 324, track mount 322, and support components 702, 704, 706, and 708, demonstrating positioning and dynamic movement of the bistable retractable arm 100.

The bistable retractable arm 100 is shown in its extended state and coiled state, demonstrating its ability to traverse the horizontal movement track 612. The modular support and track assembly allows the bistable retractable arm 100 to move along the track, ensuring controlled deployment and retraction within the housing 114.

The track mount 322 is mechanically connected to the belt 606, facilitating horizontal movement along the horizontal movement track 612 through the belt drive pulley 608. The stabilizing structure 324 surrounds the track mount 322, ensuring alignment and mechanical stability during operation. The pivot point 308 maintains a stable rotational axis, contributing to the arm's controlled movement along the track.

The base platform 702 serves as a foundation for the support components 704, 706, and 708, which function as mechanical guides or bearing elements, contributing to smooth movement of the bistable retractable arm 100 and maintaining alignment within the modular support and track assembly.

The deployment rail 116 is mechanically associated with the stabilizing structure 324, providing structural alignment and stability for positioning of the bistable retractable arm 100. The clamp components 602, 604, and stopper 616 function as guides and stabilizers for controlled movement of the track mount 322 along the horizontal movement track 612. The end of horizontal track 610 provides additional structural support, maintaining stability and integrity of the overall movement path.

During operation, horizontal movement of the track mount 322 is driven by the belt drive pulley 608, belt 606, and motor 628 along the horizontal movement track 612. The horizontal movement track 612 provides a structural rail or guide system dedicated to horizontal translation of the track mount 322. This mechanism allows controlled positioning and alignment of the bistable retractable arm 100 along its horizontal path of movement, independently of the deployment rail 116.

The pivot point 308 ensures a stable rotation axis, while the deployment rail 116 helps maintain the horizontal positioning of the bistable retractable arm 100 within the modular support and track assembly. The modular support and track assembly, including the stabilizing structure 324, ensures precise alignment and mechanical stability of the bistable retractable arm 100 as it moves horizontally along the horizontal movement track 612. This structural arrangement minimizes vibration, mechanical stress, and lateral displacement, enhancing controlled movement and operational precision within the system.

The deployment rail 116 defines a guided path, ensuring the bistable retractable arm 100 remains aligned during movement along the horizontal movement track 612. The clamp components 602, 604, and stopper 616 act as mechanical interfaces, supporting the modular support and track assembly by providing alignment, preventing lateral displacement, and limiting movement along the track.

In various embodiments, the modular support and track assembly may include alternative components, such as linear bearings, guide wheels, or magnetic guidance systems, to enhance precision and reduce friction. The deployment rail 116 may also incorporate adjustable stops or dampening elements, allowing for customizable deployment paths and controlled retraction speeds.

Figure 8:
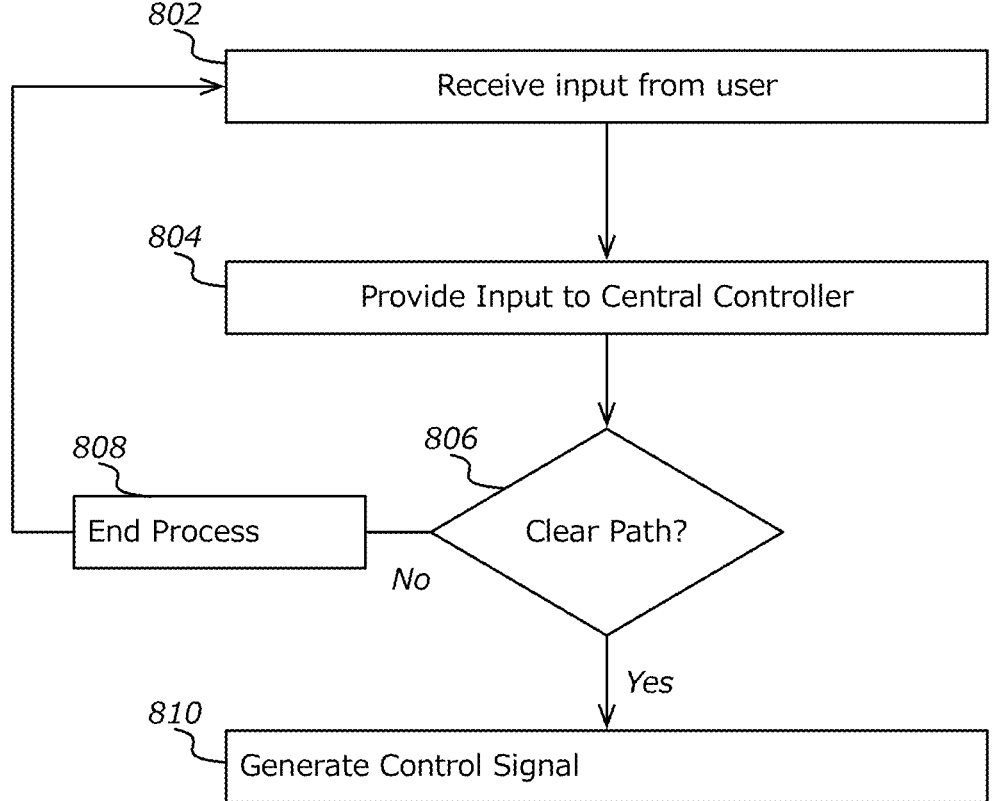
FIG. 8 illustrates an exemplary process for controlling the operation of the bistable retractable arm and modular support and track assembly based on user input signals in accordance with various embodiments.

FIG. 8 illustrates an exemplary process for controlling the operation of the bistable retractable arm 100 (referred to herein as one exemplary embodiment) and modular support and track assembly based on user input signals, in accordance with various embodiments. The steps in this flowchart represent operations performed by one or more components, including the central controller, motor 628, belt drive pulley 608, and rotational interfaces 318A, 318B, which may correspond to FIG. 1A, FIG. 1B, FIG. 6, FIG. 7, or other components. The process may include additional steps, fewer steps, or steps executed in a different order without departing from the scope of the invention, as would be apparent to one of ordinary skill in the art.

At step 802, an input signal is received. The input signal can be received from one or more sources and includes, e.g., a visual input, a gesture-based input, and/or click or button inputs. In various embodiments, the input signal may also be received from AI-based processing of screen content or an API communicating external system data. For example, an AI module may analyze the screen to determine an optimal camera position, or an API from a video conferencing application (e.g., Zoom) may provide positioning data based on detected participants.

In certain embodiments, AI-based processing is utilized to refine input signals and optimize movement control. The AI system may employ trained machine learning models that analyze sensor data, predict environmental conditions, and adjust control parameters dynamically. AI models may be trained using apparatus-generated data, external datasets, or a combination of both. These models continuously refine positioning accuracy and optimize movement efficiency over time. The AI system may function in a real-time inference mode, where decision-making occurs instantly on the device, or in a distributed mode, where input data is transmitted to an external computing device or cloud-based service for processing. In a real-time inference scenario, embedded AI models run directly on the apparatus, enabling autonomous operation without reliance on external systems. In a distributed AI architecture, the apparatus transmits sensor and input data to an external system, which processes the information and returns optimized control signals.

In an embodiment, the input methods may involve cameras, sensors, physical buttons, or digital interfaces that are mechanically, electrically, or otherwise associated with or connected to a central controller. As used herein, the central controller refers to one or more processors, microcontrollers, or computing devices configured to execute control algorithms and process data received from sensors, external inputs, or user commands. The central controller may be implemented as an integrated processing unit within the apparatus, as software executed by an external computing device, or as a distributed system where processing functions are shared between the apparatus and an external device.

The central controller is operable to analyze the input signal, identify the intended operation, and initiate control processes for the apparatus. The central controller may process data from multiple input sources simultaneously, allowing for dynamic and adaptable control of the bistable retractable arm 100 and modular support and track assembly. The central controller may also process feedback signals, such as clear path signals received from sensors associated with the horizontal movement track 612 or rotational interfaces 318A, 318B, enabling safe and controlled operation of the apparatus. The controller may be fully integrated within the apparatus, implemented externally on a computing device, or distributed between the two, depending on system design requirements. In some embodiments, the controller is fully integrated within the apparatus, processing all signals locally within the housing 114. In other embodiments, the controller is located externally on a connected computing device that receives data from the apparatus and issues control commands remotely. In certain configurations, the controller may be distributed between the apparatus and an external computing system, where real-time adjustments are handled locally while higher-level processing occurs remotely.

Sensor placement within the system may vary based on implementation needs. One or more sensors may be positioned within the system, including along components that influence movement, within the housing 114 to assess internal system conditions, or integrated into the modular device 104 to provide localized data for dynamic positioning and automated interaction with the surrounding environment. These sensors provide real-time input data to the central controller, enabling dynamic adjustments based on operational conditions.

The received input is transmitted to the central controller, which evaluates the input data, determines the intended action, and initiates the next step in the process, as described in step 804. The central controller may also evaluate feedback signals, such as clear path signals, to validate safe operating conditions before executing control actions.

At step 804, the received input signal is provided to the central controller, which may be integrated within the apparatus, connected externally, or a combination thereof. In some embodiments, the controller is fully embedded within the apparatus, executing all control functions locally. In other embodiments, the controller is implemented on an external computing device that processes received input signals and transmits control commands back to the apparatus. In some configurations, control functions are distributed between the apparatus and a remote computing device, where the apparatus manages real-time adjustments while higher-level processing occurs externally. The selection of controller placement may depend on factors such as processing load, response time constraints, and network availability.

The central controller is operable to analyze the input data, determine the intended action, and initiate the appropriate control processes. The central controller may evaluate both input signals and feedback signals, including clear path signals, safety status indicators, or operational readiness data from sensors associated with the apparatus. The input data may indicate horizontal movement, arm extension or retraction, combined operations, or activation/deactivation of the modular device. In some embodiments, AI-driven input processing or external API signals may determine optimal arm placement based on detected objects or user position, adjusting the apparatus accordingly. The system may also incorporate sensor data from different locations within the apparatus. For example, sensors may be positioned along the deployment rail 116 to monitor movement, within the housing 114 to assess internal system states, or integrated into the modular device 104 to provide direct environmental feedback. These sensors allow the central controller to dynamically adjust the position and movement of the bistable retractable arm 100 and modular device 104, ensuring precise operation and real-time responsiveness to environmental conditions.

Additionally, the feedback signals may validate safe operating conditions, ensuring the movement path is clear and that no obstructions are present. The central controller is operable to generate a control signal, which may include instructions for horizontal movement by engaging the belt drive pulley 608, arm movement by activating the motor 628, combined operations by synchronizing both systems, and/or modular device control, such as activating a camera, initiating a sensor, or controlling audio functions. The control signal may also include data packets with parameters, such as movement speed, positioning data, and specific operational modes, contributing to dynamic and adaptable control of the apparatus. Upon analyzing the input and feedback signals, the central controller determines the appropriate action and prepares to generate the control signal, as described in step 806, maintaining controlled and safe operation of the bistable retractable arm 100 and modular support and track assembly.

At step 806, a decision is made whether the movement path is clear. The central controller analyzes feedback signals from sensors associated with the apparatus, evaluating environmental data, obstacle detection inputs, and system status indicators to determine if it is safe to proceed. The movement path is considered clear when no obstacles are detected within a predefined clearance threshold, allowing for safe and unobstructed movement of the bistable retractable arm 100.

The clearance threshold may be defined by system parameters, such as minimum obstacle distance, visual clearance, or sensor data thresholds. In certain embodiments, the threshold may be set to 10 centimeters for horizontal movement, ensuring that no obstacles are within the immediate path of the bistable retractable arm 100 along the horizontal movement track 612. For rotational movement, the threshold may involve a 360-degree sensor sweep, validating that no objects are within the rotational arc of the modular support and track assembly.

The sensors may include infrared sensors, ultrasonic sensors, LiDAR systems, or visual sensors integrated with computer vision algorithms. These sensors may be positioned along the deployment rail 116, mounted on the housing 114, or integrated within the modular device itself, providing comprehensive environmental awareness. The central controller may process sensor data in real-time, ensuring continuous path monitoring and dynamic safety assessments.

In the situation where the movement path is clear, the central controller generates a control signal, allowing the apparatus to proceed with horizontal movement, arm extension/retraction, or combined operations, as described in step 810. For example, if visual sensors detect that no obstacles are present within 10 centimeters of the bistable retractable arm 100, the central controller may activate the motor 628, initiating safe extension of the arm along the horizontal movement track 612. The control signal may include specific parameters, such as movement speed, positioning data, and modular device activation, contributing to precise and controlled operation.

In the situation where the movement path is not clear, the central controller triggers a safety stop, halting all mechanical actions and preventing potential collisions or operational hazards. For instance, if an infrared sensor detects an obstacle within 5 centimeters of the deployment rail 116, the central controller may override any active control signals, engage safety locks, and prevent the bistable retractable arm 100 from extending or rotating. The system may send an alert to the user, providing visual or auditory feedback through the user interface, indicating that manual intervention or reassessment of the input signal is required. The process flow ends safely, and the apparatus resets, awaiting new input signals as described in step 802.

At step 808, the process ends when the movement path is not clear, as determined in step 806. The central controller initiates an end process protocol, ensuring safe and controlled shutdown of the apparatus's operations. In this situation, the central controller overrides active control signals, halts all mechanical actions, and prevents further movement of the bistable retractable arm 100 and modular support and track assembly. In an embodiment, the end process protocol may include engaging safety locks, disengaging motors, and deactivating the modular device, if applicable. The system may also trigger feedback signals, providing visual or auditory alerts to the user interface, indicating that the movement path is obstructed and that manual intervention or input reassessment is needed. In certain embodiments, the central controller may send diagnostic data to the user interface, including sensor readings, obstacle proximity data, and recommended corrective actions. Additionally, the central controller may process input from AI-based analysis or external APIs to determine an optimal repositioning strategy if movement is obstructed. For example, AI may analyze screen content to adjust the camera's field of view dynamically, or an API from a video conferencing application may provide positioning data for automatic realignment. This information may assist the user in clearing the path or adjusting the input signal to achieve a safe operating condition. The process flow returns to step 802, where the apparatus resets, awaiting new input signals. The central controller is operable to reinitialize sensors, clear previous control signals, and prepare the apparatus for the next operational cycle.

At step 810, the central controller generates a control signal, initiating mechanical and electrical operations of the bistable retractable arm 100 and modular support and track assembly. The control signal is formatted as a data packet, containing specific parameters such as movement speed, positioning data, operational modes, and safety protocols. The control signal may instruct the apparatus to perform horizontal movement, arm extension or retraction, combined operations, and/or modular device control.

The control signal may instruct the central controller to engage the belt drive pulley 608, allowing the belt 606 to move the track mount 322 along the horizontal movement track 612. For arm movement, the control signal may activate the motor 628, causing the rubber roller 624 to extend or retract the bistable retractable arm 100. When combined operations are required, the control signal synchronizes the horizontal and arm movements, ensuring precise positioning of the modular device along the deployment rail 116.

The control signal may also include commands to the modular device, enabling specific functionalities such as camera operation, sensor activation, audio control, or other modular device tasks. In an example scenario, the control signal may activate a camera module, instructing it to capture an image or record a video while the bistable retractable arm 100 is moving dynamically.

The control signal may incorporate safety measures, including validating clear path signals before engaging movement components, limiting movement speed in confined spaces, or stopping operations if feedback signals indicate an unsafe condition. The central controller monitors sensor data during control signal execution, ensuring real-time adaptability and safe operation of the apparatus. The sensors may include infrared sensors, ultrasonic sensors, LiDAR systems, or visual sensors, positioned along the deployment rail 116, housing 114, or within the modular device.

Upon generating the control signal, the central controller executes the corresponding action, enabling the apparatus to respond dynamically to user inputs.

For example, When the control signal initiates horizontal movement, the central controller engages the belt drive pulley 608, activating the belt 606 to move the track mount 322 along the horizontal movement track 612. The bistable retractable arm 100 is positioned dynamically along the deployment rail 116, allowing for horizontal positioning of the modular device.

In certain embodiments, the control signal may include parameters for movement speed, acceleration limits, and positioning data, enabling controlled movement within pre-defined boundaries. The central controller may continuously monitor sensor data, ensuring that the movement path remains clear, and may adjust the belt speed or stop movement if feedback signals indicate an obstruction.

For example, when extending the arm horizontally, the central controller may set the movement speed to 0.2 meters per second, limiting acceleration to maintain stability. If a sensor detects an obstacle 5 centimeters away, the central controller may halt horizontal movement, preventing a potential collision and triggering a safety alert.

In another example, if the control signal commands arm movement, the central controller activates the motor 628, causing the rubber roller 624 to extend or retract the bistable retractable arm 100. The rotational interfaces 318A, 318B adjust the arm's angle, enabling 360-degree rotation and precise positioning of the modular device.

In certain embodiments, the arm movement may be synchronized with sensor inputs, allowing the apparatus to adapt to real-time conditions. The central controller may control the extension speed, set positional limits, and monitor feedback signals, ensuring that rotational and linear movements are coordinated safely.

For example, when the apparatus is instructed to retract the arm, the central controller may initiate a controlled retraction sequence, monitoring the arm's position through rotational sensors. If the feedback signals indicate that the arm is nearing its fully retracted position, the central controller may slow the motor speed, engage safety locks, and provide a confirmation signal to the user interface.

In yet another example, when the control signal synchronizes horizontal and arm movements, the central controller coordinates both systems, ensuring that the bistable retractable arm 100 moves along the horizontal track while extending or retracting. This combined operation enhances the apparatus's versatility, supporting complex positioning tasks and enabling precise deployment of the modular device.

The central controller may generate a composite control signal, integrating movement instructions for the belt drive pulley 608, motor 628, and rotational interfaces 318A, 318B. The system may validate all sensor feedback, ensuring no obstructions are present along the movement path, and synchronize movement speeds to maintain stability.

For instance, if the apparatus needs to extend the arm while moving horizontally, the central controller may engage both the belt drive and motor simultaneously, allowing the arm to reach a specific position along the deployment rail 116 while rotating to the desired angle. The feedback loop ensures dynamic adjustments, preventing over-extension or misalignment.

In yet another example, if the control signal includes instructions for the modular device, the central controller activates or deactivates the device, enabling specific functionalities. The modular device may include cameras, sensors, audio components, or other modular attachments, each offering distinct capabilities.

In certain embodiments, the central controller may trigger a camera module to capture an image or start a video recording while the bistable retractable arm 100 is moving dynamically. The modular device may also collect sensor data, broadcast audio, or receive external signals, contributing to multi-functional operation of the apparatus.

For example, if the modular device is a microphone, the control signal may activate the microphone when the arm reaches a specified position, enabling audio capture during a video conference. The central controller may also monitor audio signals, providing automatic gain control or noise suppression based on environmental feedback.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Any of the above-mentioned systems, units, modules, engines, controllers, interfaces, components, or the like may comprise hardware and/or software as described herein. For example, the systems described in association with the central controller, bistable retractable arm 100, modular support and track assembly, motor 628, belt drive pulley 608, rotational interfaces 318A, 318B, and subcomponents thereof may comprise computing hardware and/or software as described herein in association with the figures. Furthermore, any of the above-mentioned systems, units, modules, engines, controllers, interfaces, components, or the like may use and/or comprise an application programming interface (API) for communicating with other systems, units, modules, engines, controllers, interfaces, components, or the like for obtaining and/or providing data or information.

Figure 9:
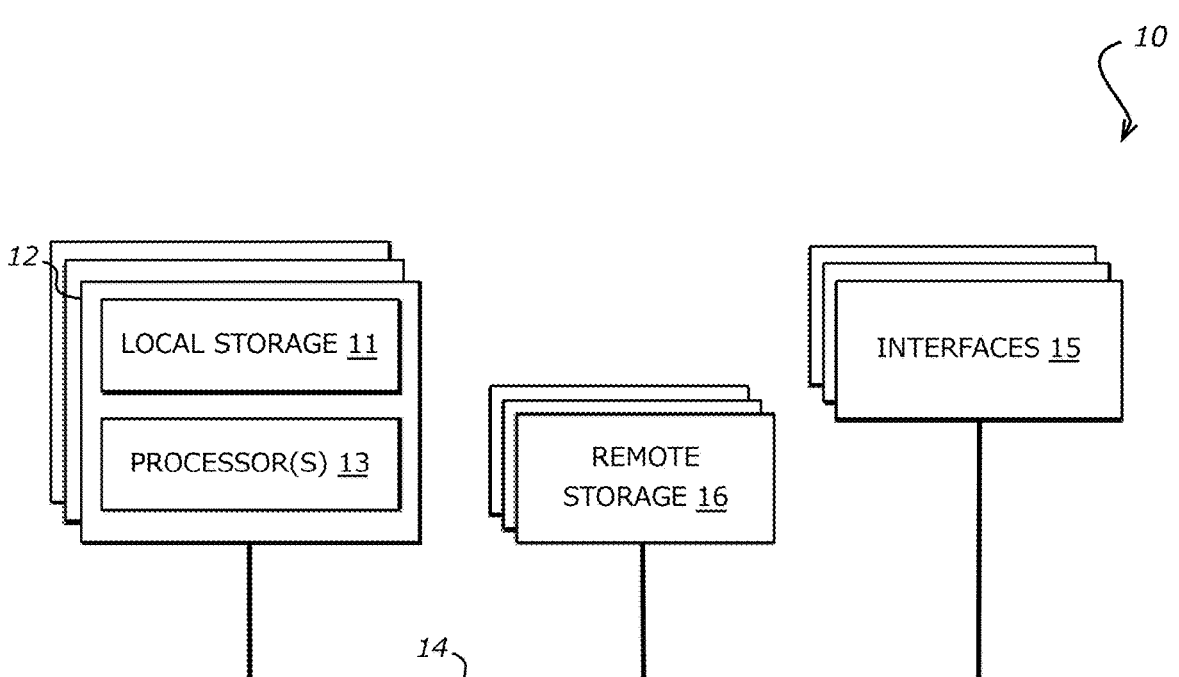
FIG. 9 illustrates one embodiment of the computing architecture that supports an embodiment of the inventive disclosure.

Referring now to FIG. 9, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random-access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAP-DRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 9 illustrates one specific architecture for a computing device 10 for implementing one or more of the embodiments described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, single processor 13 handles communications as well as routing computations, while in other embodiments a separate dedicated communications processor may be provided. In various embodiments, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 10:
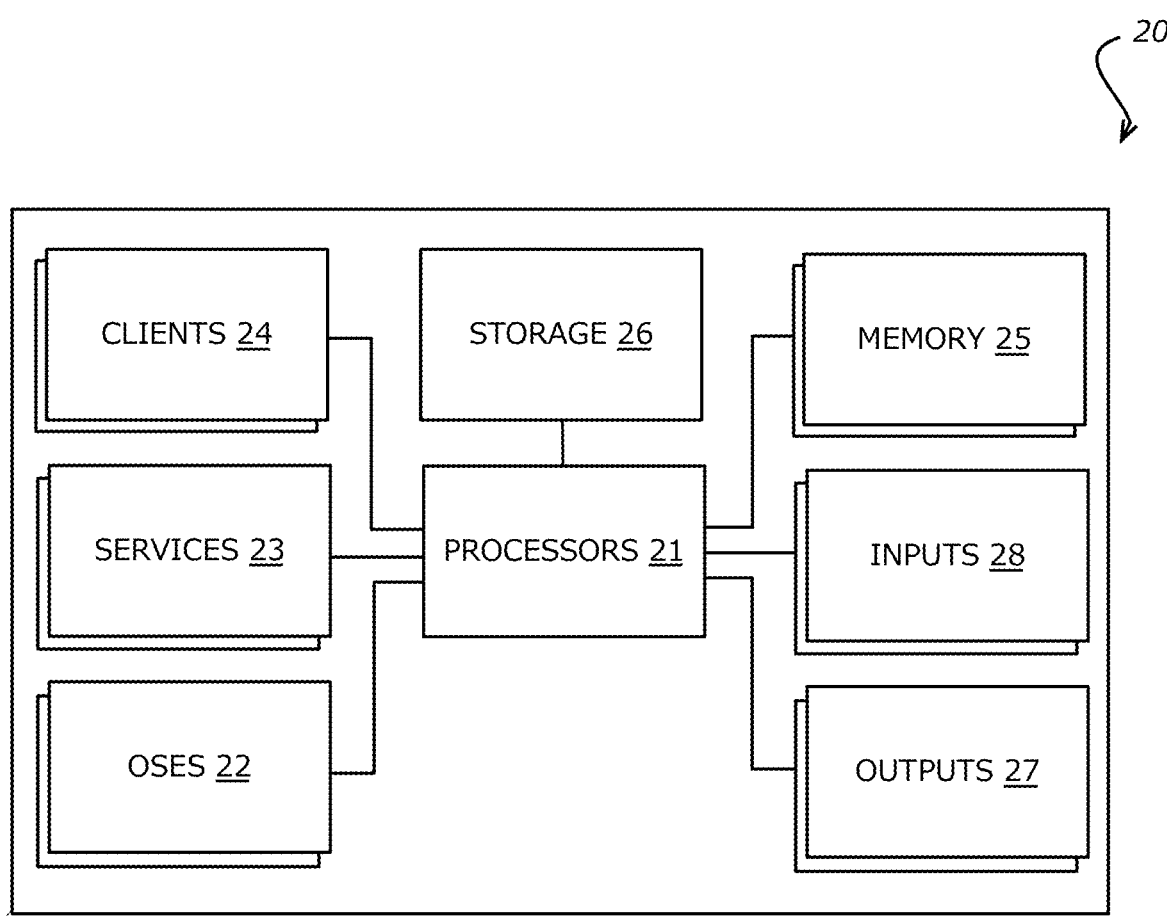
FIG. 10 illustrates components of a system architecture that supports an embodiment of the inventive disclosure.

In some embodiments, systems may be implemented on a standalone computing system. Referring now to FIG. 10, there is shown a block diagram depicting a typical exemplary architecture of one or more embodiments or components thereof on a standalone computing system. Computing device 20 includes processors 21 that may run software that carry out one or more functions or applications of embodiments, such as for example a client application. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 9). Examples of storage devices 26 include flash memory, magnetic hard drive, CD-ROM, and/or the like.

Figure 11:
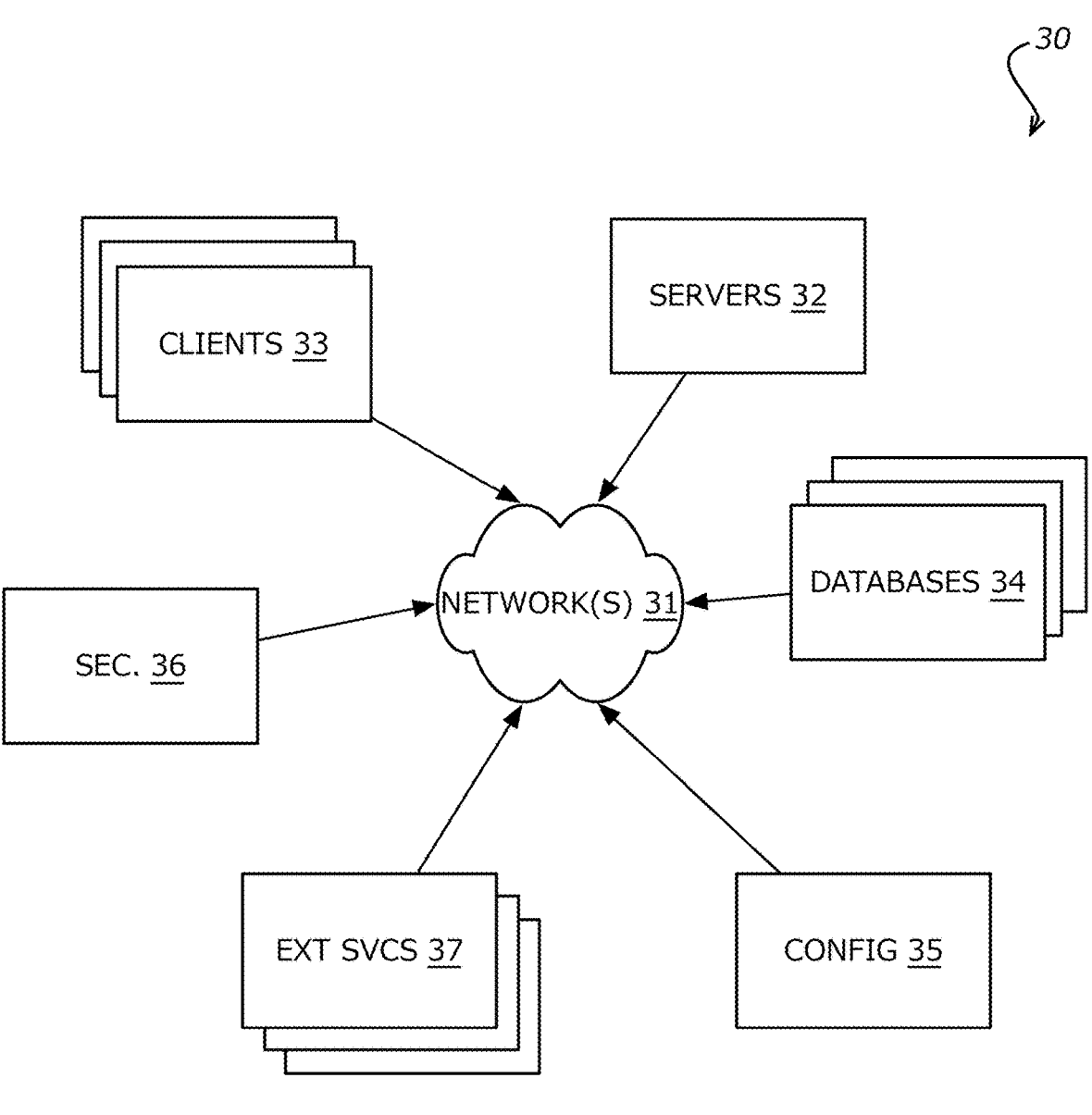
FIG. 11 illustrates components of a computing device that supports an embodiment of the inventive disclosure.

In some embodiments, systems may be implemented on a distributed computing network, such as one having any number of clients and/or servers. Referring now to FIG. 11, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 10. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in one aspect where client applications are implemented on a smartphone or other electronic device, client applications may obtain information stored in a server system 32 in the cloud or on an external service 37 deployed on one or more of a particular enterprise's or user's premises.

In some embodiments, clients 33 or servers 32 (or both) may make use of one or more specialized services or appliances that may be deployed locally or remotely across one or more networks 31. For example, one or more databases 34 may be used or referred to by one or more embodiments. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some embodiments may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments without limitation, unless a specific security 36 or configuration system 35 or approach is specifically required by the description of any specific aspect.

Figure 12:
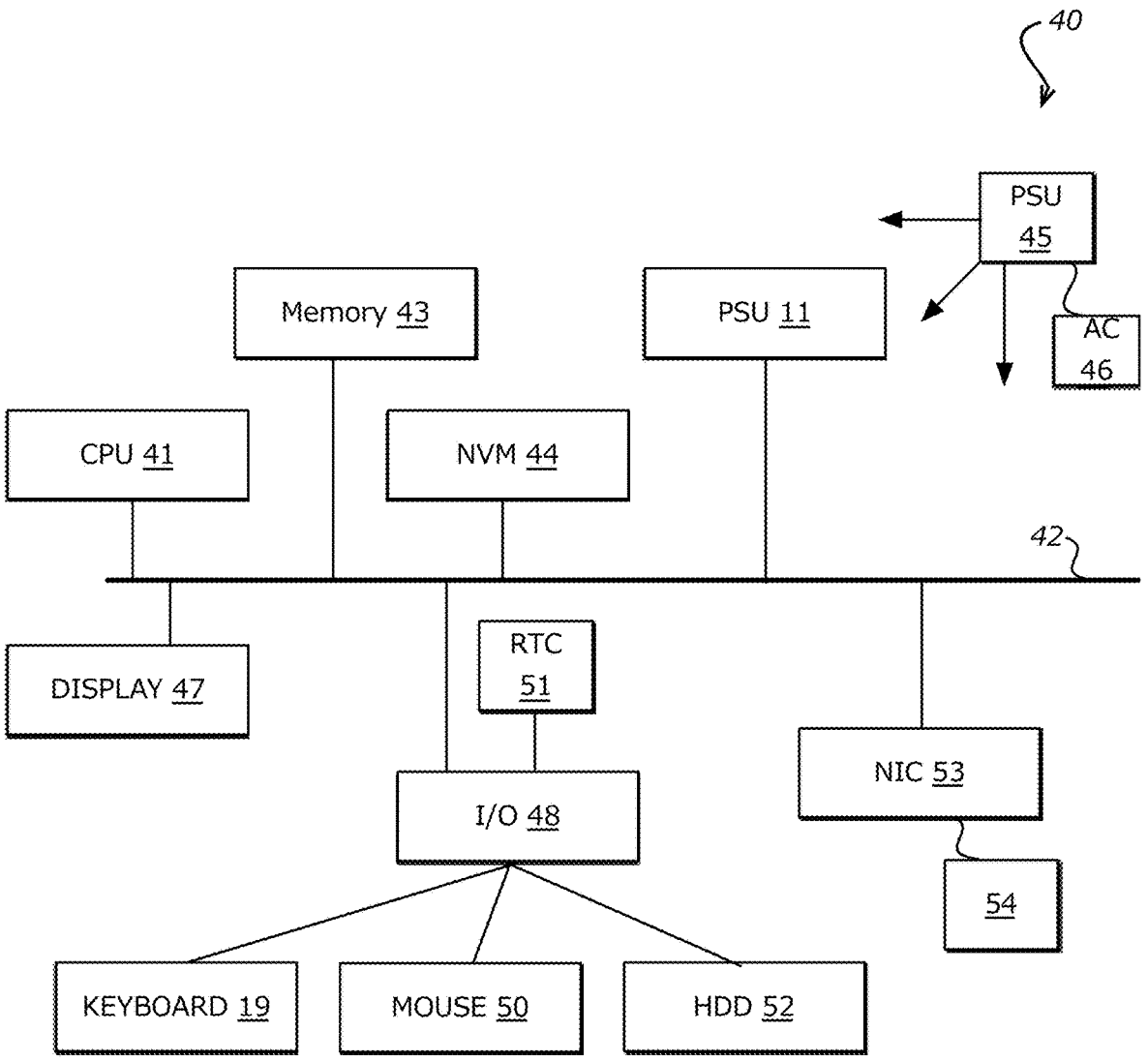
FIG. 12 illustrates components of a computing device that supports an embodiment of the inventive disclosure.

FIG. 12 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of various embodiments may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various embodiments described above. Accordingly, the present invention is defined by the claims and their equivalents.

Additional Considerations

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for facilitating database queries through the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed is:

1. An apparatus, comprising:
   a housing configured to enclose and support a retractable arm;
   a retractable arm configured to transition between a first position and a second position relative to the housing;
   a support assembly configured to guide the retractable arm along a path of movement, the support assembly including guiding components operable to control movement along the path of movement;
   a flexible conductor integrated with the retractable arm, the flexible conductor operable to maintain electrical connectivity between a modular device and a controller;
   a rotary joint assembly configured to provide rotational movement of the retractable arm while maintaining electrical connectivity through the flexible conductor;
   one or more sensors operable to obtain sensor data; and
   a controller operable to:
      receive the sensor data and generate control signals to manage operation of the retractable arm, including movement along the path of movement and modular device control;
      adapt the control signals by modifying operational parameters of the retractable arm and the modular device in response to the sensor data; and
      generate alerts, including visual, auditory, or haptic feedback, based on the sensor data indicating obstructions along the path of movement.

2. The apparatus of claim 1, further comprising a deployment rail, wherein the deployment rail is mechanically associated with the housing and operable to guide horizontal movement of the apparatus relative to a mounting surface.

3. The apparatus of claim 1, wherein the path of movement includes linear and curved sections and is guided by components including bearing systems, guide wheels, or magnetic guidance elements.

4. The apparatus of claim 1, wherein the support assembly includes a track mount, a belt drive pulley, and a motor, each mechanically associated with the path of movement and operable to control movement of the retractable arm along the path of movement.

5. The apparatus of claim 1, further comprising a curvature structure, wherein the curvature structure is operable to provide rigidity in an extended position.

6. The apparatus of claim 1, wherein the support assembly includes a tensioning mechanism, operable to maintain stability of the retractable arm during movement along the path of movement.

7. The apparatus of claim 1, wherein the controller is operable to generate composite control signals for combined linear and rotational movement of the retractable arm.

8. The apparatus of claim 1, wherein the modular device includes one or more of a camera, a sensor, an audio component, a lighting module, or an integrated active surface.

9. The apparatus of claim 1, wherein the rotary joint assembly includes rotary traces and spring-loaded contacts, configured to maintain electrical connectivity through the flexible conductor during rotational movement.

10. The apparatus of claim 1, wherein the controller is operable to implement safety measures, including stopping operations if feedback signals indicate an unsafe condition.

11. A system, comprising:
a housing configured to enclose and support a retractable arm;
a retractable arm configured to transition between a first position and a second position relative to the housing;
a support assembly configured to guide the retractable arm along a path of movement, the support assembly including components operable to control movement along the path of movement;
a flexible conductor integrated with the retractable arm, the flexible conductor operable to maintain electrical connectivity between a modular device and a controller;
a rotary joint assembly configured to provide rotational movement of the retractable arm while maintaining electrical connectivity through the flexible conductor;
one or more sensors operable to obtain sensor data; and
a controller operable to:
receive the sensor data and generate control signals to manage operation of the retractable arm, including movement along the path of movement and modular device control;
adapt the control signals by modifying operational parameters of the retractable arm and the modular device in response to the sensor data; and
generate alerts, including visual, auditory, or haptic feedback, based on the sensor data indicating obstructions along the path of movement.

12. The system of claim 11, wherein the one or more sensors include infrared sensors, ultrasonic sensors, LiDAR systems, or visual sensors.

13. The system of claim 11, wherein the sensor data includes environmental conditions, positional data, or proximity information.

14. The system of claim 13, wherein the controller is operable to analyze the sensor data to detect obstacles, validate clear paths, and adjust positioning and movement of the retractable arm.

15. The system of claim 11, wherein the controller is operable to override movement commands if sensor data indicates an unsafe condition.

16. The system of claim 11, wherein the one or more sensors are configured to detect environmental conditions, including temperature, humidity, or proximity to external objects.

17. A system, comprising:
a housing configured to enclose and support a retractable arm;
a retractable arm configured to transition between a first position and a second position relative to the housing;
a support assembly configured to guide the retractable arm along a path of movement, the support assembly including components operable to control movement along the path of movement;
a flexible conductor integrated with the retractable arm, the flexible conductor operable to maintain electrical connectivity between a modular device and a controller;
a rotary joint assembly configured to provide rotational movement of the retractable arm while maintaining electrical connectivity through the flexible conductor;
one or more sensors configured to obtain sensor data;
a processor, operable to execute instructions, the instructions causing the system to:
receive the sensor data;
generate control signals, the control signals including instructions to manage operation of the retractable arm, including movement along the path of movement and modular device control;
adapt the control signals by modifying operational parameters of the retractable arm and the modular device in response to the sensor data; and
in response to determining obstructions along the path of movement based on the sensor data, generate alerts, including visual, auditory, or haptic feedback.

18. The system of claim 17, wherein the sensor data includes environmental conditions, positional data, or proximity information, and the controller is operable to analyze the sensor data to detect obstacles, validate clear paths, and adjust positioning and movement of the retractable arm.

19. The system of claim 17, wherein executing control signals includes validating sensor data for clear paths, synchronizing movement components, and initiating safety protocols if sensor data indicates an unsafe condition.

* * * * *